US012766945B2

(12) United States Patent
Bodepudi et al.

(10) Patent No.: US 12,766,945 B2
(45) Date of Patent: Oct. 20, 2026

(54) CHASSIS OF ELECTRIC VEHICLE INCLUDING SUB FRAME OVERLAPPING BATTERY HOUSING

(71) Applicant: KUBOTA CORPORATION, Osaka (JP)

(72) Inventors: Revanth Bodepudi, Fremont, CA (US); Brian Graf, Fremont, CA (US)

(73) Assignee: KUBOTA CORPORATION, Osaka (JP)

( * ) Notice: Subject to any disclaimer, the term of this patent is extended or adjusted under 35 U.S.C. 154(b) by 433 days.

(21) Appl. No.: 18/532,132

(22) Filed: Dec. 7, 2023

(65) Prior Publication Data

US 2025/0135871 A1 May 1, 2025

Related U.S. Application Data

(60) Provisional application No. 63/546,288, filed on Oct. 30, 2023.

(51) Int. Cl.

| | |
|---|---|
| ***B60K 11/06*** | (2006.01) |
| ***B60K 1/04*** | (2019.01) |
| ***B60K 11/08*** | (2006.01) |
| ***B60L 50/60*** | (2019.01) |
| ***B60R 16/02*** | (2006.01) |
| ***H01M 50/249*** | (2021.01) |

(52) U.S. Cl.

CPC ................ *B60K 11/06* (2013.01); *B60K 1/04* (2013.01); *B60K 11/08* (2013.01); *B60L 50/66* (2019.02); *B60R 16/0215* (2013.01); *H01M 50/249* (2021.01); *B60K 2001/0438* (2013.01); *B60L 2200/40* (2013.01); *H01M 2220/20* (2013.01)

(58) Field of Classification Search

CPC .................... B60K 2001/0411; B60L 2200/40

See application file for complete search history.

(56) References Cited

U.S. PATENT DOCUMENTS

| | | | | |
|---|---|---|---|---|
| 11,407,298 | B1 * | 8/2022 | Boe | B62D 55/06 |
| 12,252,173 | B1 * | 3/2025 | Kieke | B62D 21/02 |
| 12,319,134 | B2 * | 6/2025 | Hashimoto | B60K 1/04 |
| 12,358,448 | B2 * | 7/2025 | Nadiadi | B60L 50/64 |
| 12,497,106 | B2 * | 12/2025 | Kataria | B62D 21/186 |
| 12,583,309 | B1 * | 3/2026 | Smith | B60K 6/48 |
| 2016/0297289 | A1 * | 10/2016 | Ito | B60K 7/0007 |
| 2019/0263242 | A1 * | 8/2019 | Huff | B60K 7/0007 |
| 2020/0220129 | A1 * | 7/2020 | Thurmeier | H01M 50/227 |

(Continued)

FOREIGN PATENT DOCUMENTS

| | | | | | |
|---|---|---|---|---|---|
| DE | 202022105090 | U1 * | 12/2022 | | B60L 58/20 |
| KR | 20130040287 | A | 4/2013 | | |
| KR | 20230060249 | A * | 5/2023 | | B60K 1/04 |

OTHER PUBLICATIONS

Official Communication issued in corresponding European Patent Application No. 24207701.4, mailed on Apr. 1, 2025, 8 pages.

(Continued)

*Primary Examiner* — Katy M Ebner

(74) *Attorney, Agent, or Firm* — Keating & Bennett, LLP

(57) ABSTRACT

An electric work vehicle includes a chassis, a battery housing, and a front axle. The chassis includes a sub frame that is attached to the front axle and supports the battery housing. A portion of the sub frame overlaps a portion of the battery housing in a front view of the electric work vehicle.

17 Claims, 37 Drawing Sheets

(56) References Cited

U.S. PATENT DOCUMENTS

| | | | | |
|---|---|---|---|---|
| 2020/0324668 | A1* | 10/2020 | Huff | B60L 58/20 |
| 2022/0041042 | A1* | 2/2022 | Drabon | B60K 1/02 |
| 2022/0097535 | A1* | 3/2022 | Hickey | B60K 1/00 |
| 2022/0314766 | A1* | 10/2022 | Cavnic | F16F 1/38 |
| 2022/0379704 | A1* | 12/2022 | Tottori | B60K 1/04 |
| 2023/0072758 | A1* | 3/2023 | Kataria | B62D 21/186 |
| 2023/0132970 | A1* | 5/2023 | Hashimoto | B60K 1/04 180/65.6 |
| 2023/0391195 | A1* | 12/2023 | Arata | B60L 15/007 |
| 2025/0050840 | A1* | 2/2025 | Peterson | B60L 53/80 |
| 2025/0121667 | A1* | 4/2025 | Wright | B60K 1/04 |
| 2025/0121704 | A1* | 4/2025 | Ng | B60K 1/04 |
| 2025/0135857 | A1* | 5/2025 | Nadiadi | B60L 50/66 |
| 2025/0135870 | A1* | 5/2025 | Wright | B60L 50/66 |
| 2025/0135871 | A1* | 5/2025 | Bodepudi | B60L 58/26 |
| 2025/0135876 | A1* | 5/2025 | Graf | B60K 25/00 |
| 2025/0135918 | A1* | 5/2025 | Anattasakul | B60L 50/64 |
| 2025/0135919 | A1* | 5/2025 | Wright | B60L 58/26 |
| 2025/0135923 | A1* | 5/2025 | Nadiadi | B62D 25/12 |
| 2025/0135956 | A1* | 5/2025 | Bodepudi | H01M 10/6566 |
| 2026/0027916 | A1* | 1/2026 | Patel | B60K 1/04 |

OTHER PUBLICATIONS

Official Communication issued in corresponding European Patent Application No. 24207701.4, mailed on Apr. 9, 2025, 2 pages.

Kieke, “Chassis of Electric Work Vehicle Including Intermediate Frame With Depression on Rear Surface Thereof”, U.S. Appl. No. 18/532,123, filed Dec 7, 2023.

Kieke, “Chassis of Electric Work Vehicle Including Intermediate Frame With Interior Space”, U.S. Appl. No. 18/532,119, filed Dec 7, 2023.

Kieke, “Chassis of Electric Work Vehicle Including Intermediate Frame With Isolation Structure”, U.S. Appl. No. 18/532,125, filed Dec 7, 2023.

* cited by examiner

CHASSIS OF ELECTRIC VEHICLE INCLUDING SUB FRAME OVERLAPPING BATTERY HOUSING

BACKGROUND OF THE INVENTION

1. Field of the Invention

The present invention is directed to an electric vehicle (EV) such as an electric tractor.

2. Description of the Related Art

Electric vehicles (EVs) are becoming more prevalent as the industry moves from internal combustion engines towards fully electrically powered motors running on battery systems.

SUMMARY OF THE INVENTION

Preferred embodiments of the present invention provide an electric work vehicle such as an EV tractor.

Preferred embodiments of the present invention provide an electric vehicle.

An electric work vehicle includes a chassis, a battery housing, and a front axle. The chassis includes a sub frame that is attached to the front axle and supports the battery housing. A portion of the sub frame overlaps a portion of the battery housing in a front view of the electric work vehicle.

The sub frame can be connected to the battery housing. A portion of the battery housing can be located above the sub frame in an up-down direction of the electric work vehicle. A portion of the battery housing can be located behind the sub frame in a front-rear direction of the electric work vehicle.

The electric work vehicle can further include a cooling structure. The sub frame can include a recessed portion, and at least a portion of the cooling structure can be located within the recessed portion of the sub frame. The cooling structure can include a fan. The cooling structure can include at least one post that is mounted to the recessed portion of the sub frame.

The sub frame can include a slanted portion connected to the battery housing, and the slanted portion can include a first opening covered by a removable plate. The slanted portion can include a second opening connected to a first air duct. The first air duct can be further connected to a battery housing opening.

The sub frame can includes a third opening connected to a second air duct. The second air duct can be further connected to a battery housing opening.

The slanted portion can include a fourth opening. At least one electrical cable can pass through the fourth opening.

The electric work vehicle can further include a side housing connected to the sub frame. The side housing can be connected to the slanted portion of the sub frame.

The electric work vehicle can further include an evaporator. The sub frame can include a first slanted portion connected to the battery housing and a second slanted portion connected to the battery housing. The evaporator can be located between the first slanted portion and the second slanted portion.

The electric work vehicle can further include an evaporator housed within the sub frame.

The chassis can include an intermediate frame attached to a rear portion of the battery housing. The intermediate frame can be made of metal.

According to preferred embodiments of the present disclosure, it is possible to provide an electric vehicle.

The above and other features, elements, steps, configurations, characteristics, and advantages of the present invention will become more apparent from the following detailed description of preferred embodiments of the present invention with reference to the attached drawings.

DETAILED DESCRIPTION OF PREFERRED EMBODIMENTS

Electric vehicles according to preferred embodiments of the present invention may be a tractor or other agricultural vehicle, but any desirable type of electric vehicle is applicable to and usable with preferred embodiments of the present invention.

Figure 1A:
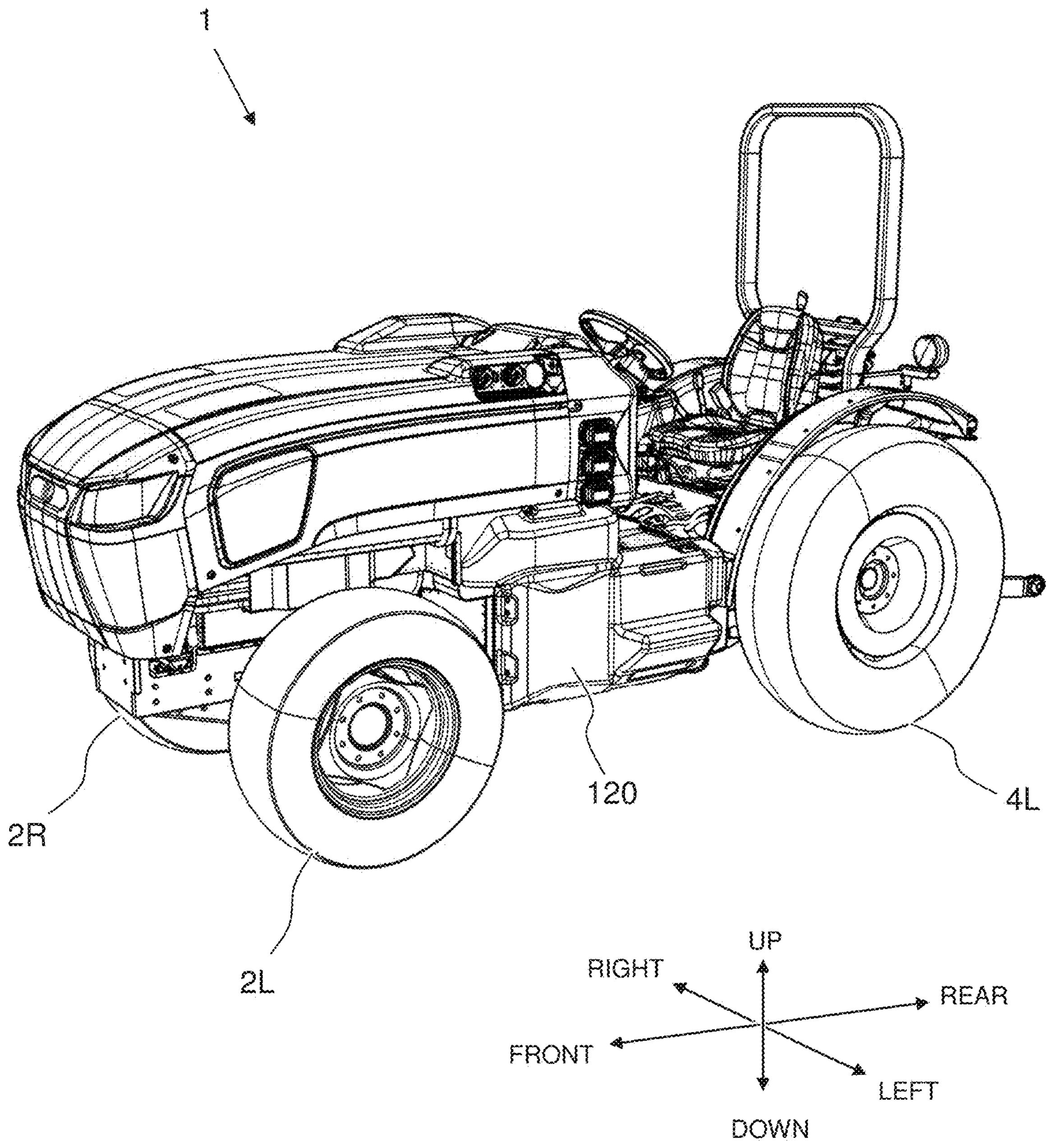
FIG. 1A shows a perspective left-front view of an electric vehicle according to a preferred embodiment of the present invention.
Figure 1B:
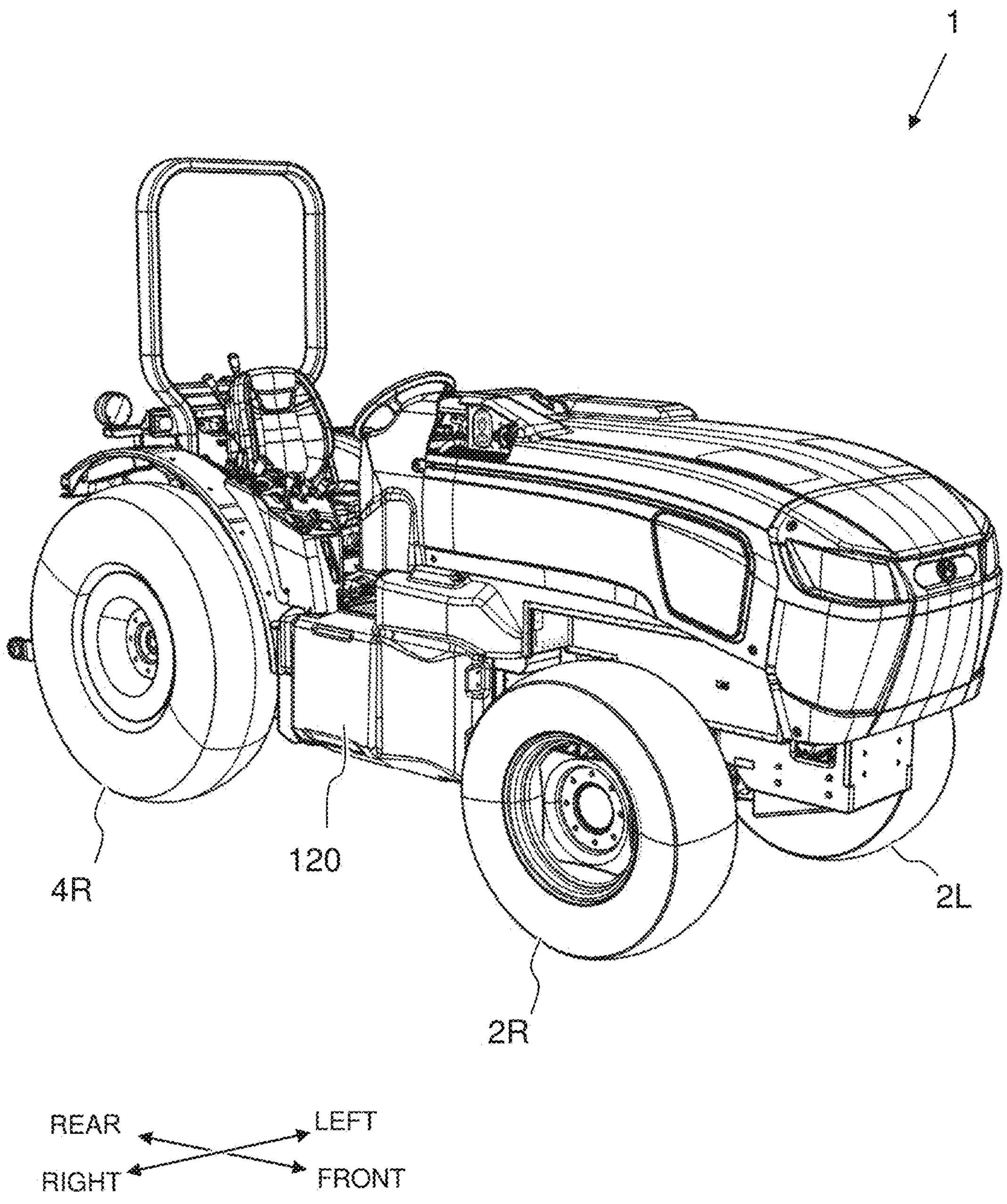
FIG. 1B shows a perspective right-front view of an electric vehicle according to a preferred embodiment of the present invention.
Figure 1C:
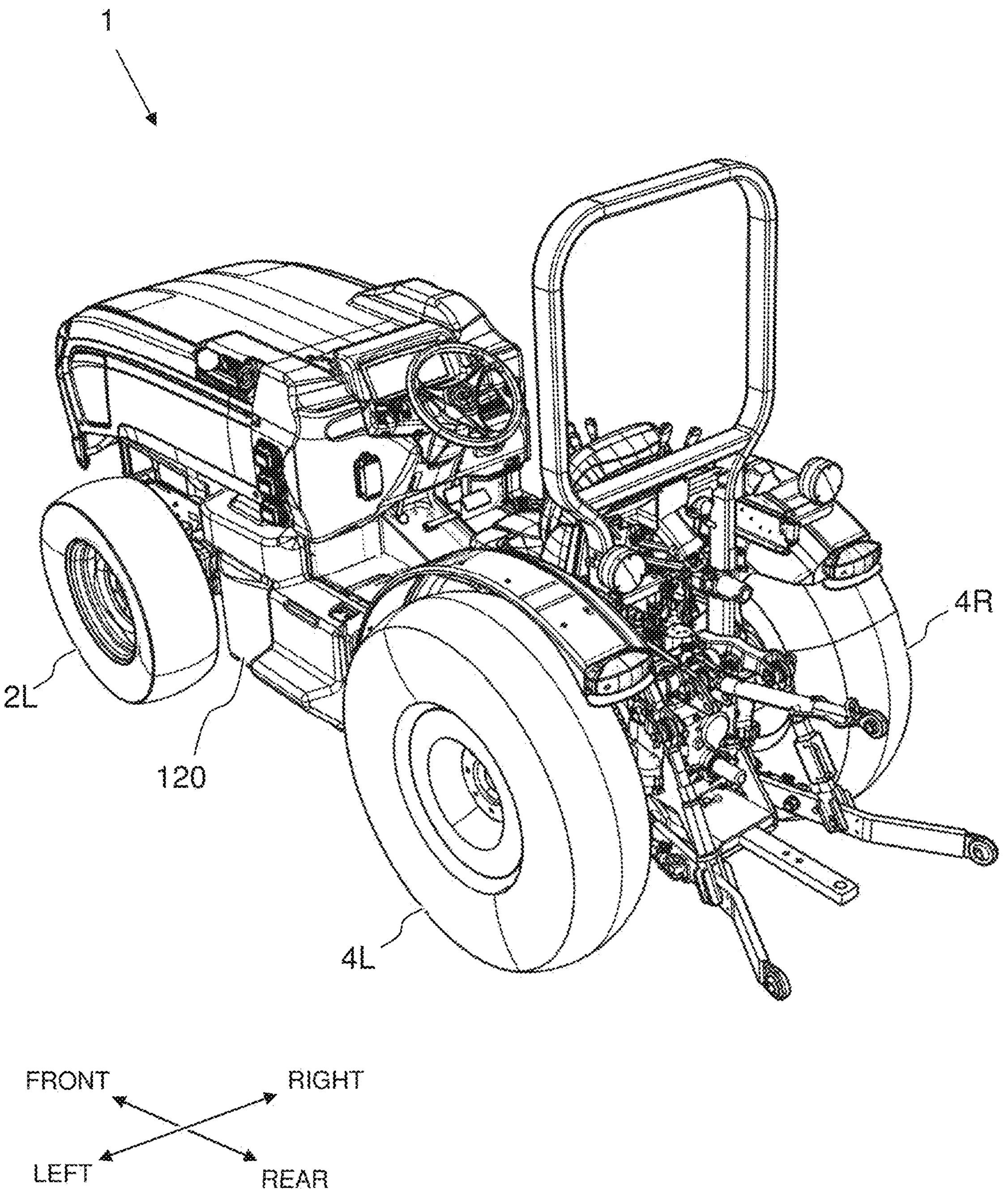
FIG. 1C shows a perspective left-rear view of an electric vehicle according to a preferred embodiment of the present invention.
Figure 1D:
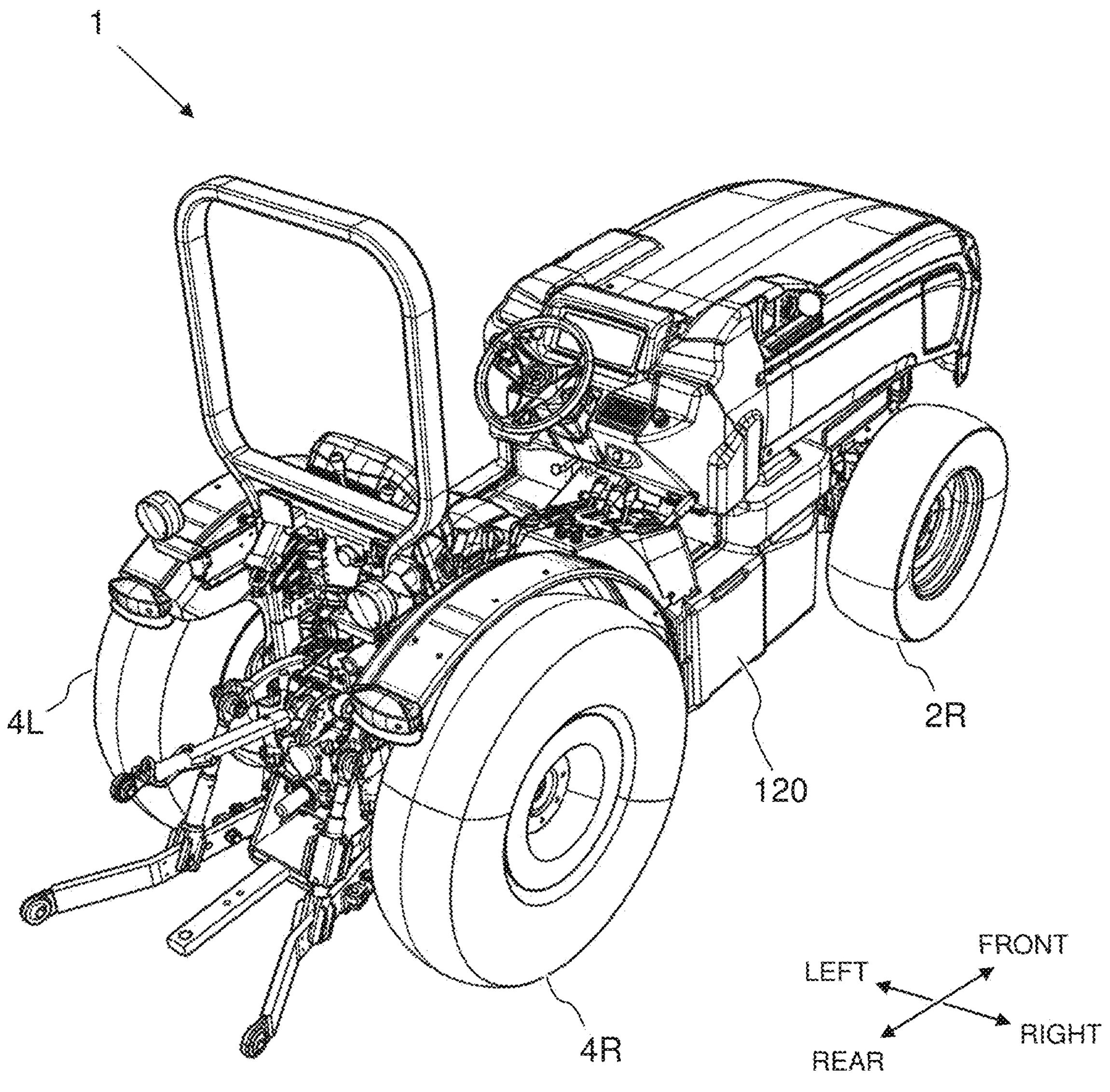
FIG. 1D shows a perspective right-rear view of an electric vehicle according to a preferred embodiment of the present invention.
Figure 1E:
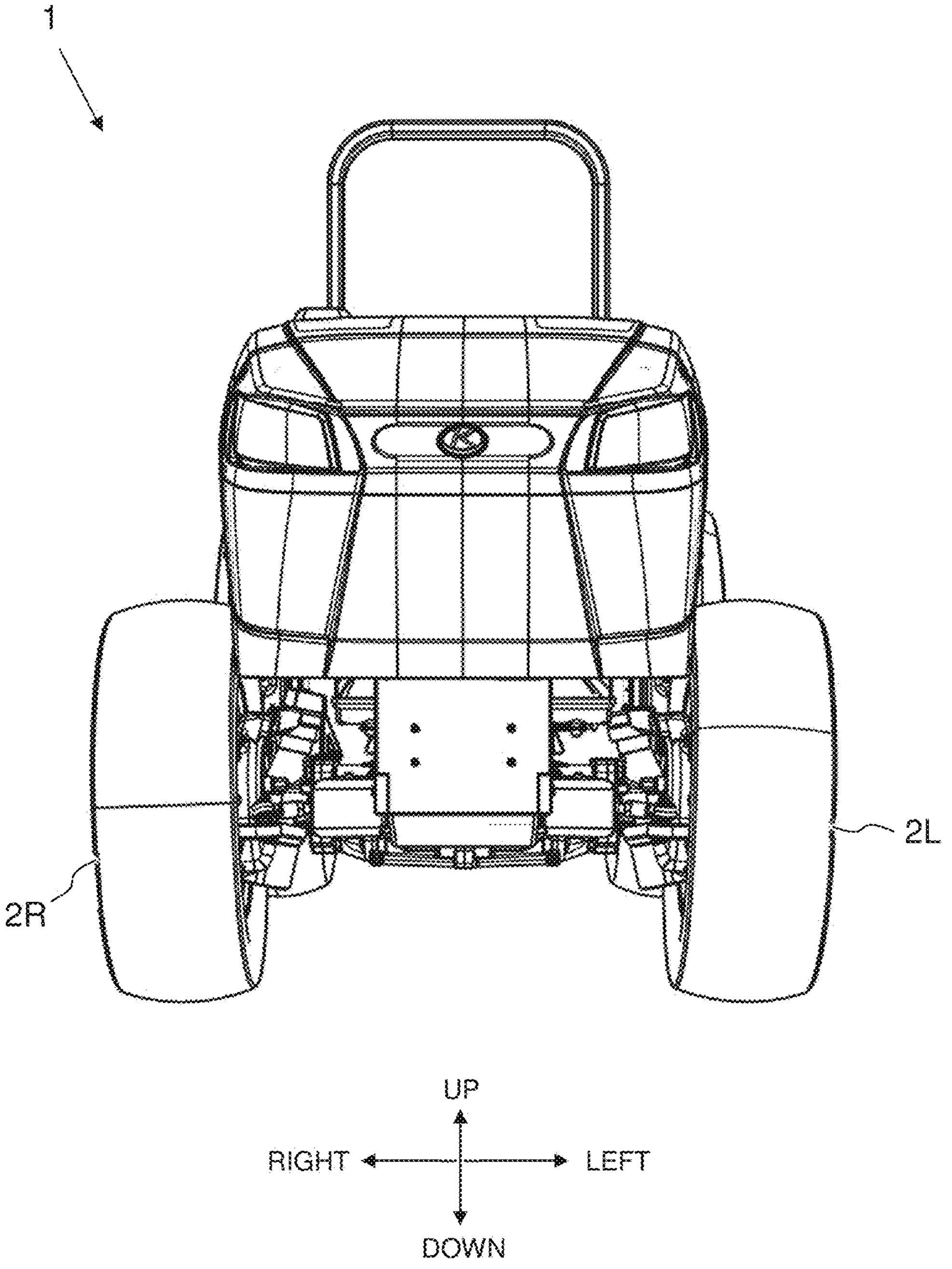
FIG. 1E shows a front view of an electric vehicle according to a preferred embodiment of the present invention.
Figure 1F:
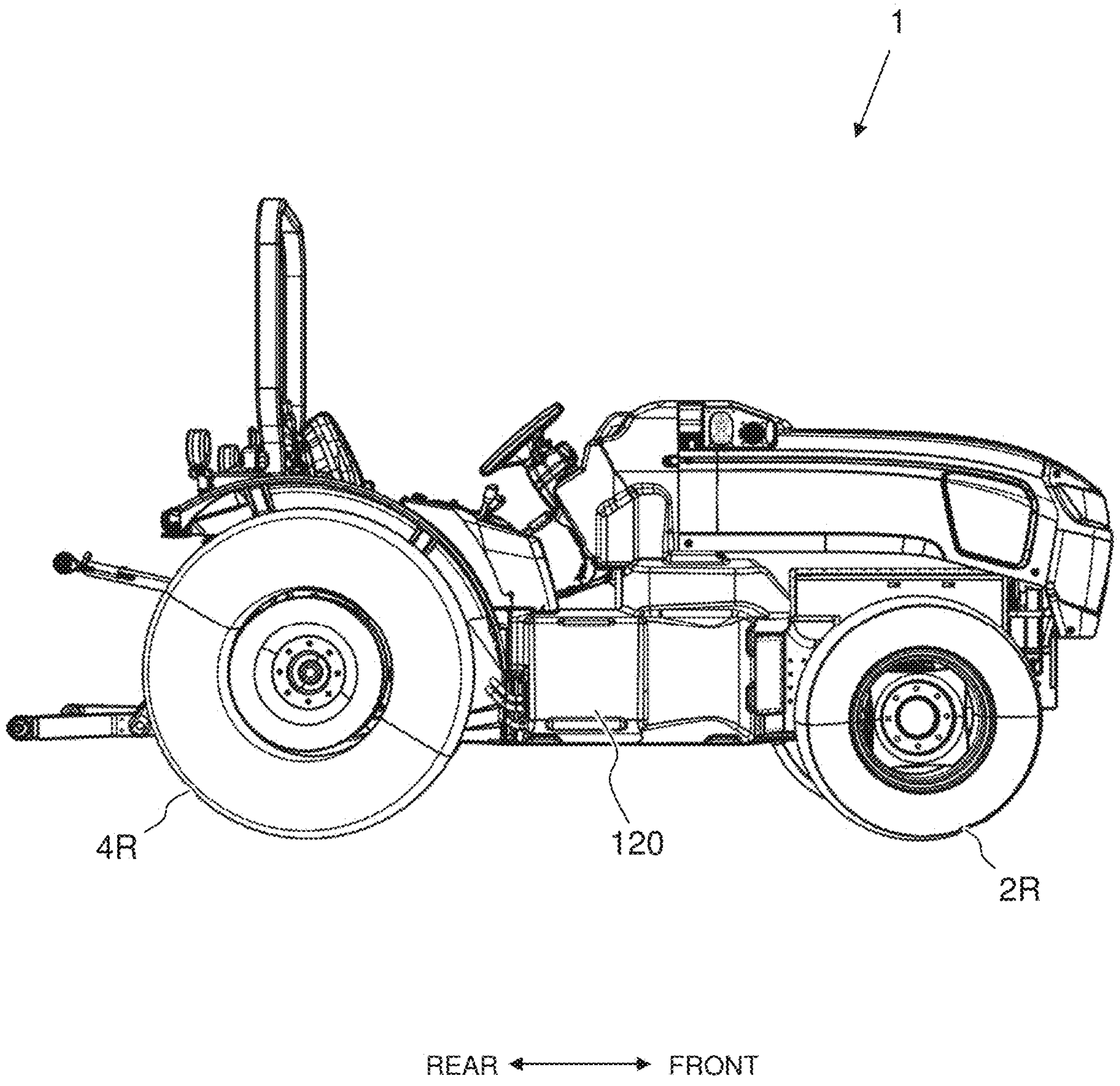
FIG. 1F shows a right side view of an electric vehicle according to a preferred embodiment of the present invention.
Figure 1G:
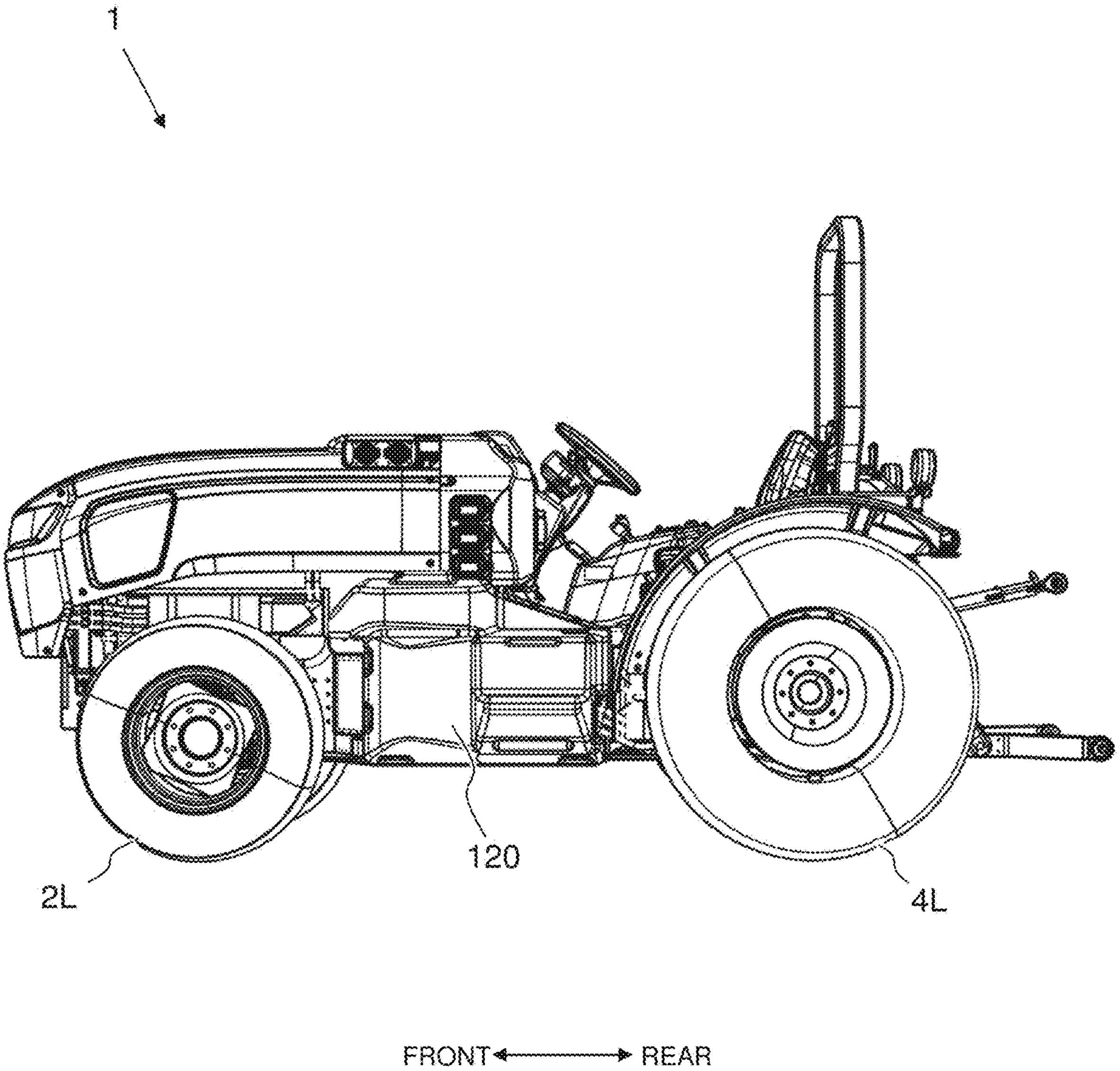
FIG. 1G shows a left side view of an electric vehicle according to a preferred embodiment of the present invention.
Figure 1H:
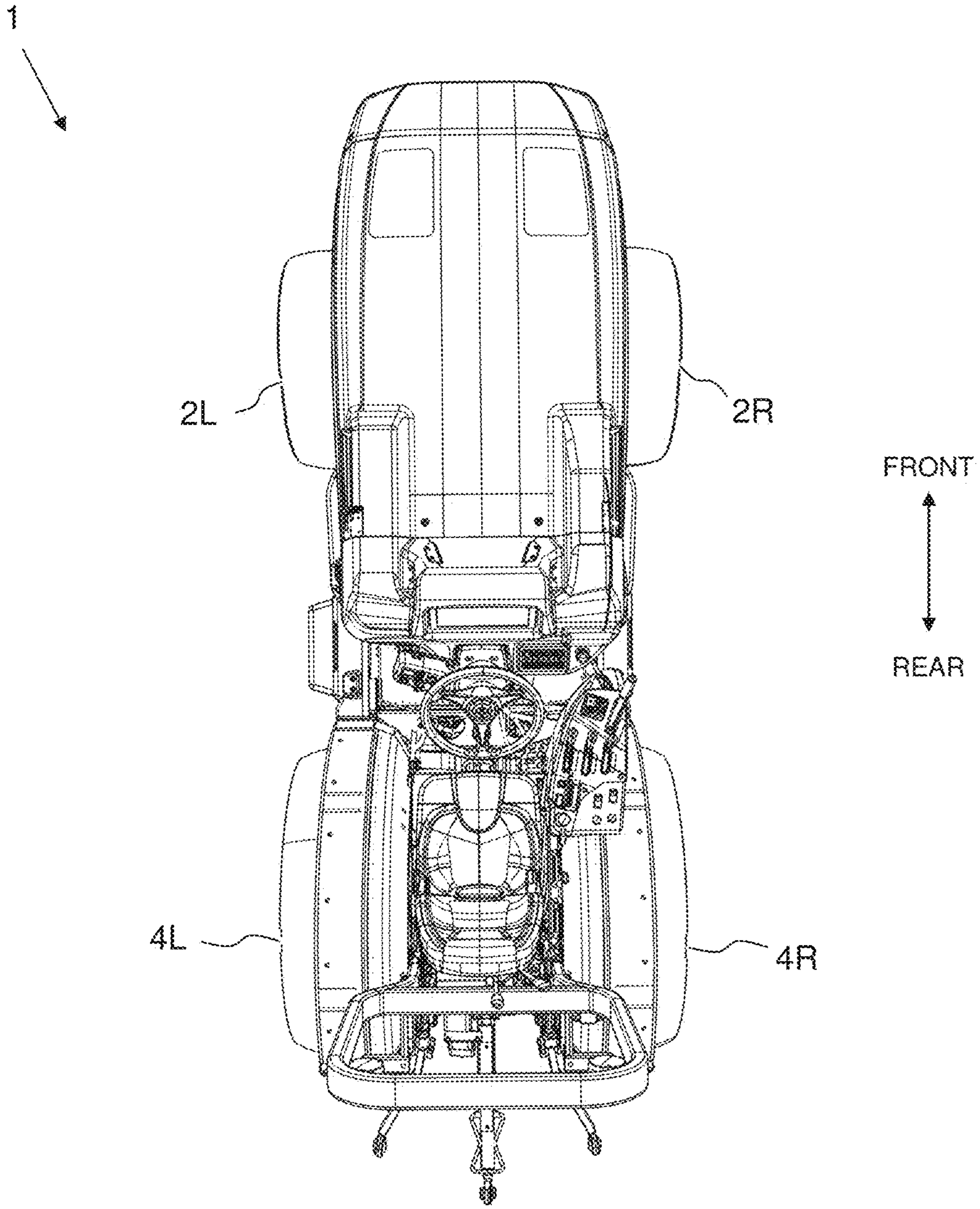
FIG. 1H shows a top view of an electric vehicle according to a preferred embodiment of the present invention.
Figure 1I:
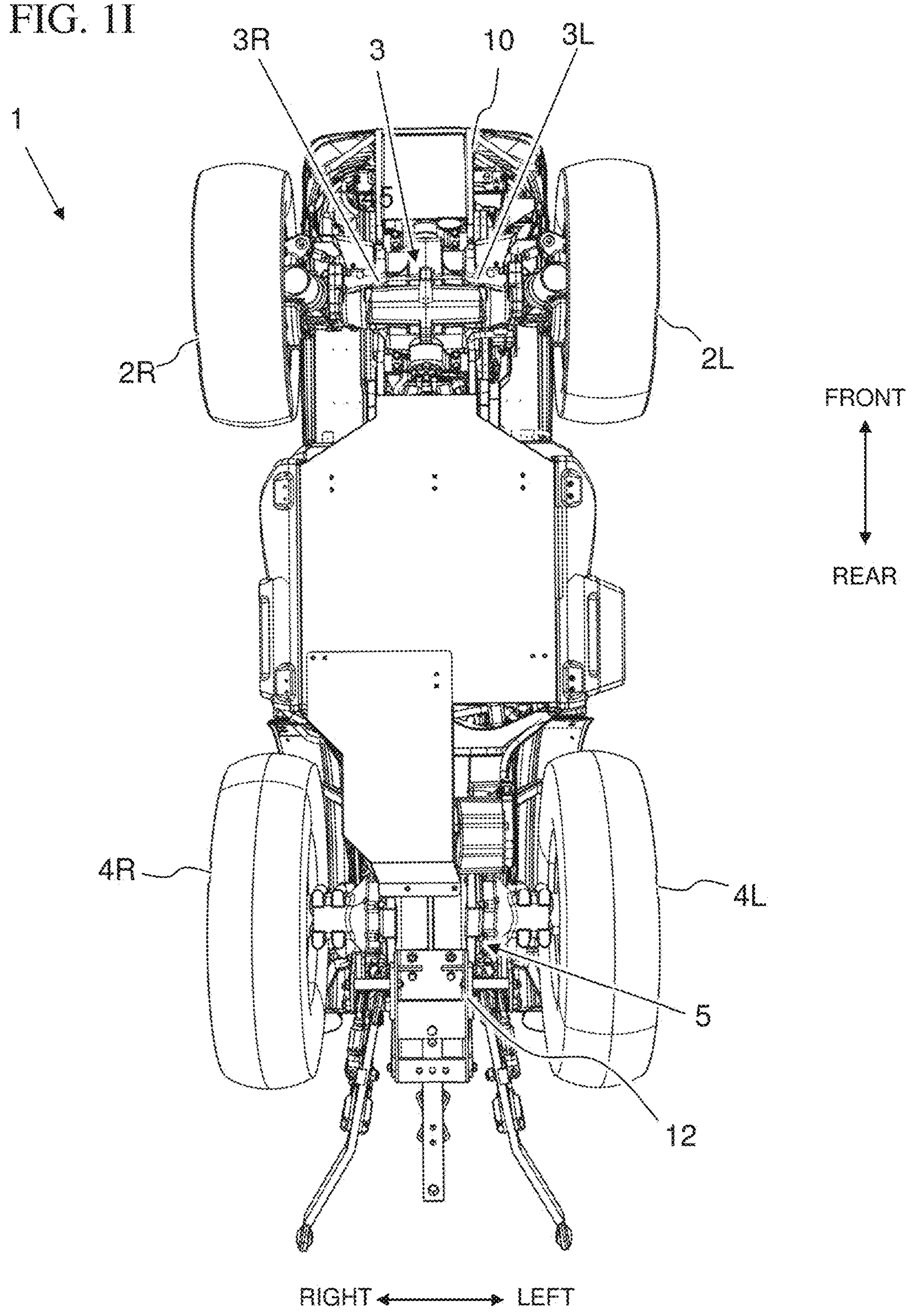
FIG. 1I shows a bottom view of an electric vehicle according to a preferred embodiment of the present invention.

FIG. 1A to 1I show an electric vehicle 1 according to a preferred embodiment of the present invention. FIGS. 1A and 1B show perspective views from left and right front ends of the vehicle 1, respectively. FIG. 1C shows an isometric view from a left rear end of the vehicle 1. FIG. 1D shows an isometric view from a right rear end of the vehicle 1. FIG. 1E shows a front view of the vehicle 1. FIGS. 1F and 1G are side views of the vehicle 1. FIGS. 1H and 1I are top and bottom views of the vehicle 1, respectively.

In a preferred embodiment of the present invention, as shown, for example, in FIGS. 1A-1H, the vehicle 1 includes a left front wheel 2L, a right front wheel 2R, a left rear wheel 4L, and a right rear wheel 4R. However, a vehicle according to the preferred embodiments of the present invention is not specifically limited to four wheels, and may include any appropriate number of wheels. For example, a vehicle according to the preferred embodiments may include only three wheels by removing one of the aforementioned four wheels, a fifth wheel (e.g., an additional wheel provided in line with a pair of one of the aforementioned four wheels or a wheel provided at a front or rear of the vehicle, etc.), six total wheels by including a pair of center wheels, and the like. In an alternative preferred embodiment, tracks can be used instead of wheels.

Figure 2:
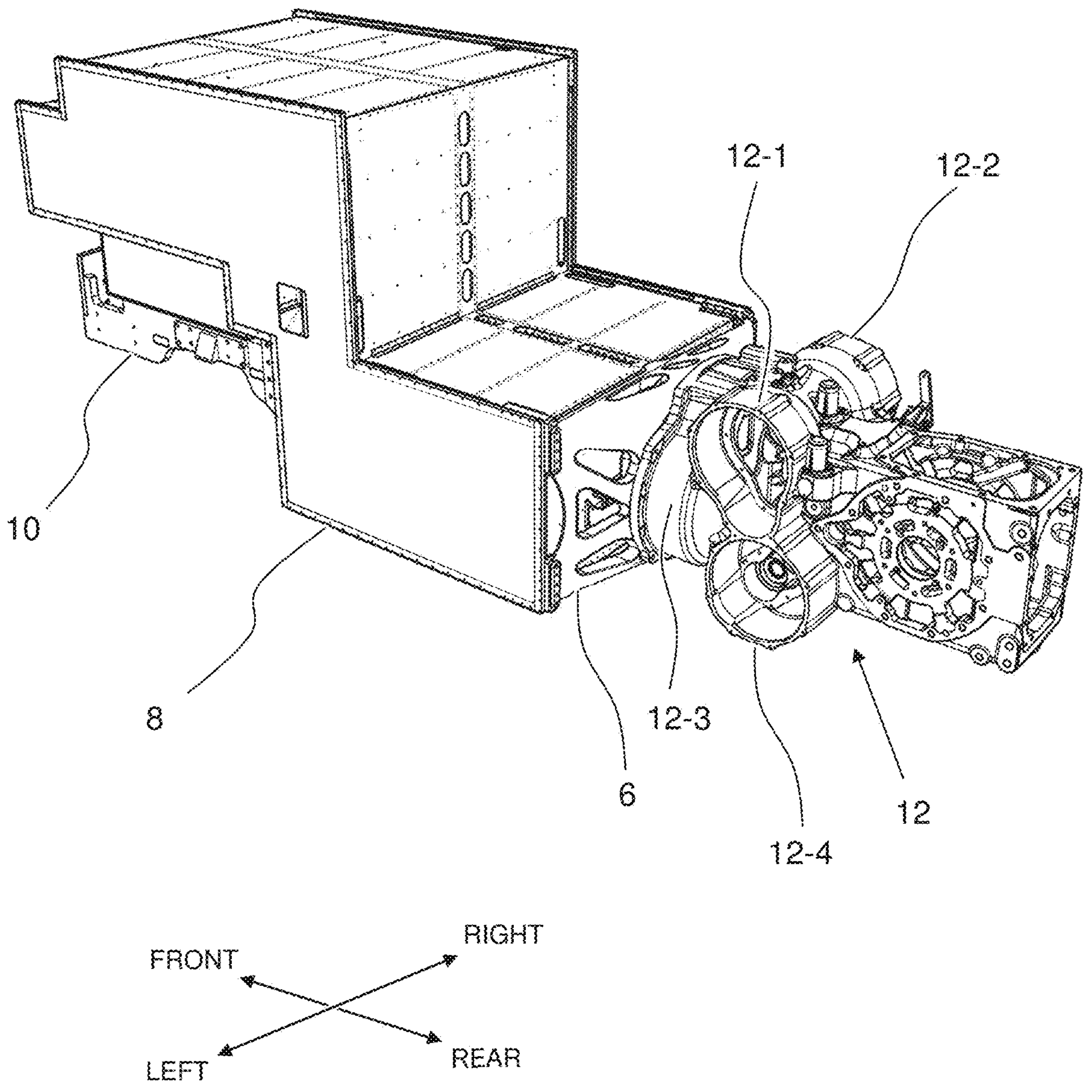
FIG. 2 shows a rear perspective view of an intermediate frame, a battery housing, a front frame, and a rear frame of an electric vehicle according to a preferred embodiment of the present invention.

In a preferred embodiment of the present invention, the vehicle 1 includes an intermediate frame 6, a battery housing 8 attached to a front portion of the intermediate frame 6, a front frame 10 attached to the battery housing 8, and a rear frame 12 attached a rear portion of the intermediate frame 6, as shown in FIG. 2, for example. In a preferred embodiment, a front axle 3 connected to the left front wheel 2L and a right front wheel 2R is connected to and supports the front frame 10, and a rear axle 5 connected to the left rear wheel 4L and the right rear wheel 4R is connected to and supported by the rear frame 12, as shown in FIG. 1I, for example.

In a preferred embodiment of the present invention, the front axle 3 includes a left axle housing 3L and a right axle housing 3R, as shown in FIG. 1I. The left axle housing 3L houses a first electric motor 14 (a left-front-wheel electric motor) that is connected to a first gearing 15 to drive the left front wheel 2L, and the right axle housing 3R houses a second electric motor 16 (a right-front-wheel electric motor) that is connected to a second gearing 17 to drive the right front wheel 2R. The first electric motor 14, the second electric motor 16, the first gearing 15, and the second gearing 17 are shown, for example, in FIG. 1J in which the left axle housing 3L and the right axle housing 3R have been removed for illustrative purposes.

Figure 1J:
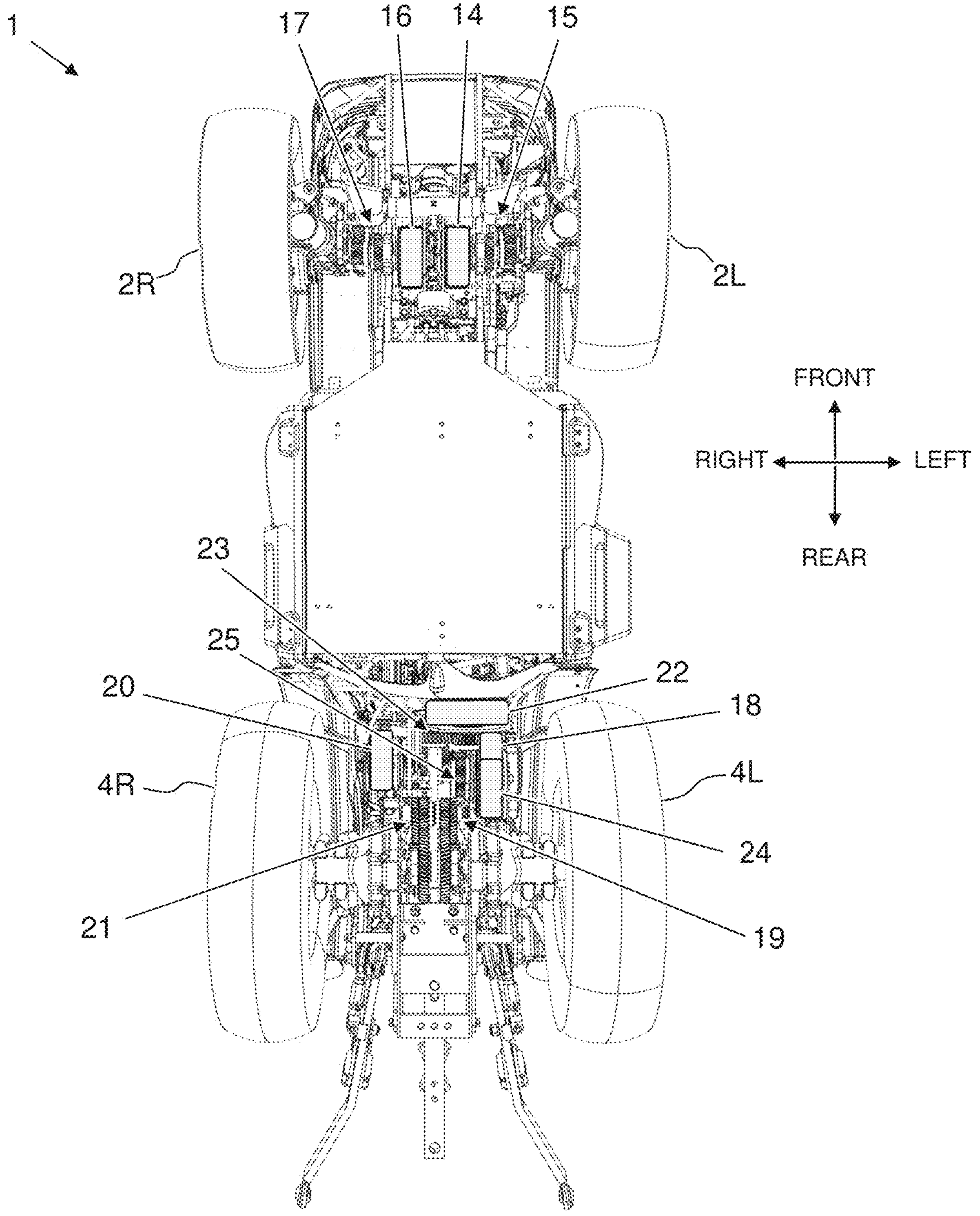
FIG. 1J shows a bottom view of an electric vehicle according to a preferred embodiment of the present invention in which certain elements have been removed for illustrative purposes.

In a preferred embodiment of the present invention, the rear frame 12 includes a first motor housing portion 12-1 to house a third electric motor 18 (a left-rear-wheel electric motor) that is connected to a third gearing 19 to drive the left rear wheel 4L, and a second motor housing portion 12-2 to house a fourth electric motor 20 (a right-rear-wheel electric motor) that is connected to a fourth gearing 21 to drive the right rear wheel 4R. Preferably, the rear frame 12 also includes a third motor housing portion 12-3 to house a fifth electric motor 22 that is connected to a fifth gearing 23 to drive a first electric vehicle component (e.g., a power take-off (PTO)), and a fourth motor housing portion 12-4 to house a sixth electric motor 24 that is connected to a sixth gearing 25 to drive a second electric vehicle component (e.g., a hydraulic system), as shown in FIGS. 1J and 2, for example. The third electric motor 18, the fourth electric motor 20, the fifth electric motor 22, and the sixth electric motor 24 are shown, for example, in FIG. 1J in which elements including the rear frame 12 have been removed for illustrative purposes. In the bottom view of FIG. 1J, the sixth electric motor 24 overlaps the third electric motor 18.

Figure 3:
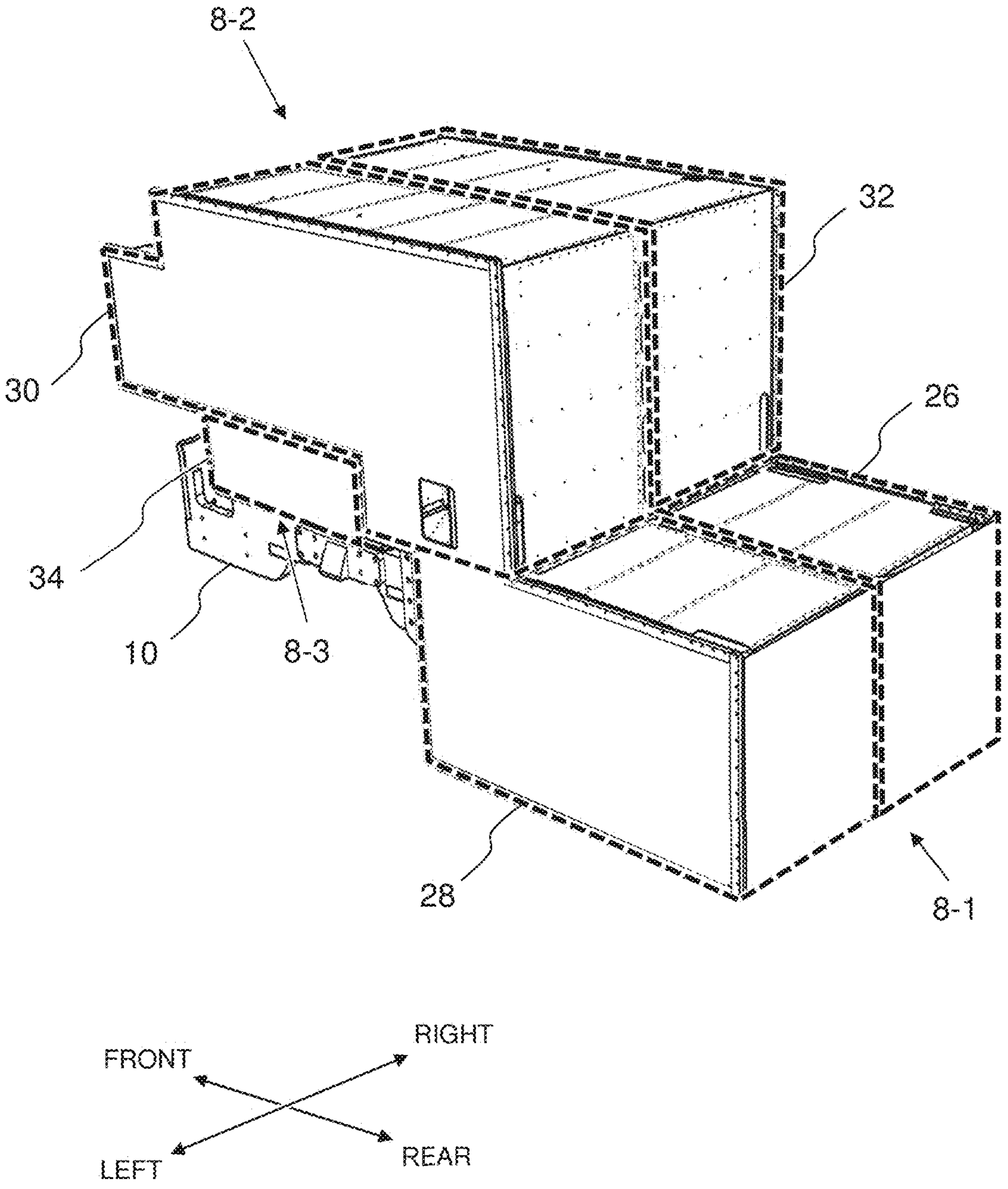
FIG. 3 shows a rear perspective view of a battery housing and a front frame of an electric vehicle according to a preferred embodiment of the present invention.
Figure 4:
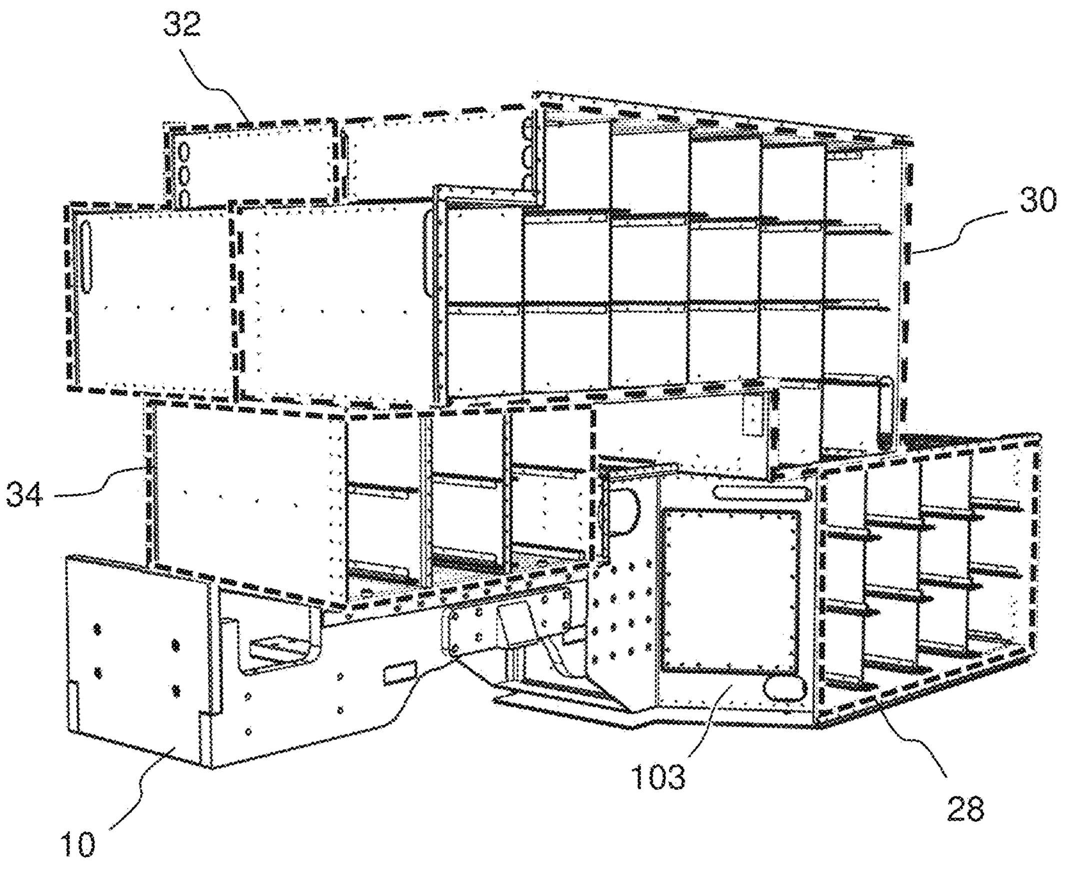
FIG. 4 shows a front perspective view of a battery housing according to a preferred embodiment of the present invention.
Figure 5A:
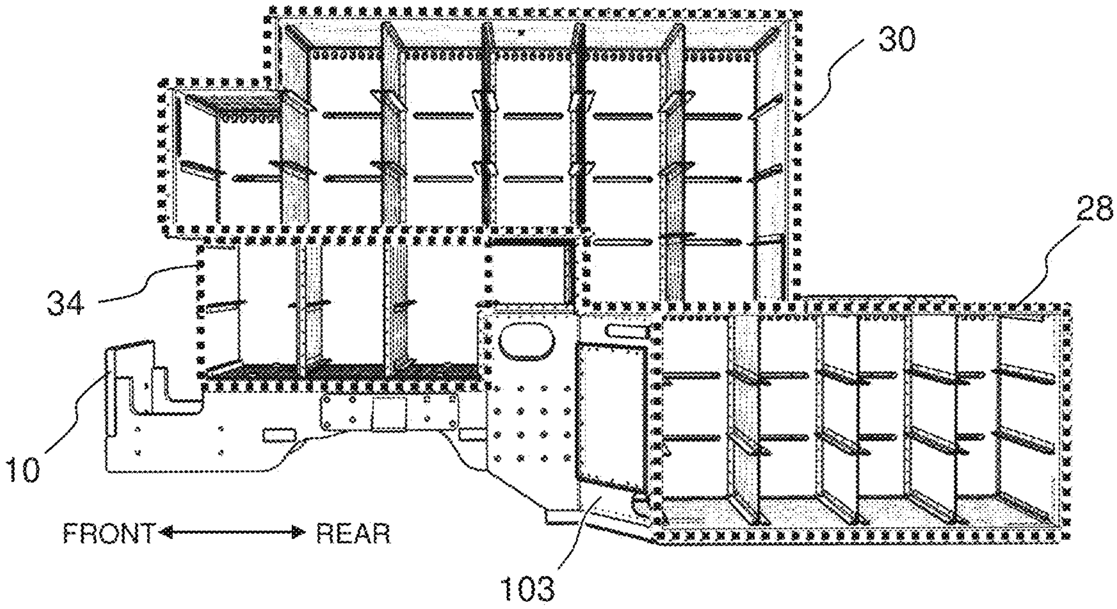
FIG. 5A shows a left side view of a battery housing according to a preferred embodiment of the present invention.
Figure 5B:
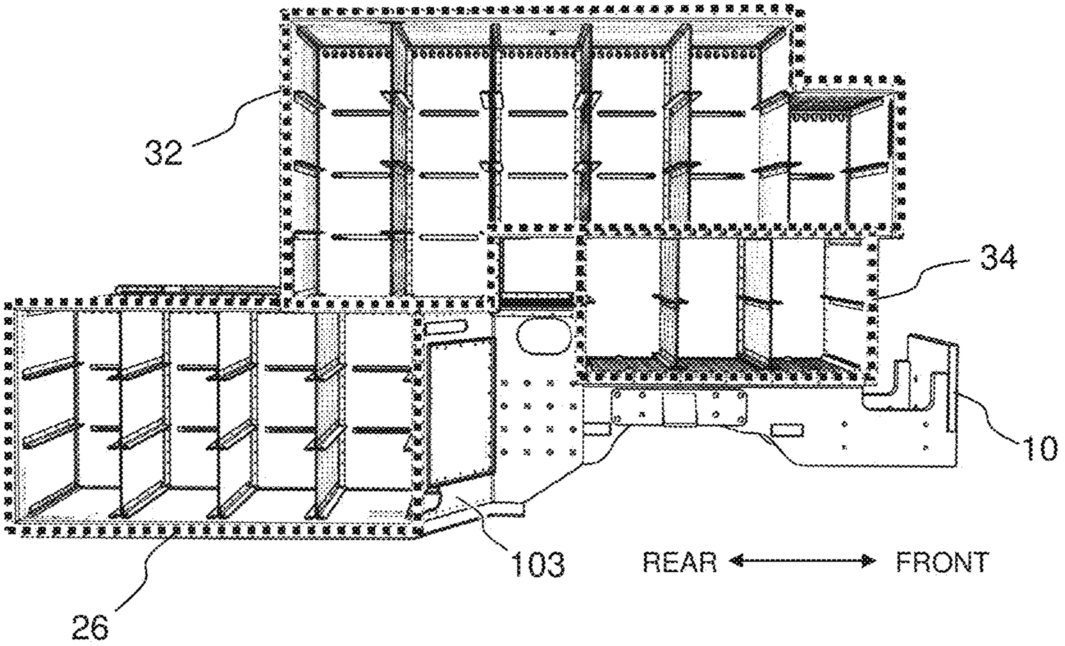
FIG. 5B shows a right side view of a battery housing according to a preferred embodiment of the present invention.

In a preferred embodiment of the present invention, the battery housing 8 includes a first battery housing portion 26, a second battery housing portion 28, a third battery housing portion 30, a fourth battery housing portion 32, and a fifth battery housing portion 34, each of which is shown in FIG. 3 using dashed lines. In a preferred embodiment, the first battery housing portion 26 and the second battery housing portion 28 are adjacent to each other in a width direction of the vehicle, and the third battery housing portion 30 and the fourth battery housing portion 32 are adjacent to each other in a width direction of the vehicle. In a preferred embodiment, a width of each of the first battery housing portion 26, the second battery housing portion 28, the third battery housing portion 30, the fourth battery housing portion 32, and the fifth battery housing portion 34 in a width direction of the vehicle is equal or substantially equal. FIGS. 4, 5A, and 5B show the battery housing 8 with the battery housing portion covers removed for illustrative purposes.

In a preferred embodiment of the present invention, the first battery housing portion 26 and the second battery housing portion 28 are included in a first battery housing section 8-1 (a rear battery housing section), the third battery housing portion 30 and the fourth battery housing portion 32 are included in a second battery housing section 8-2 (a forward-upper battery housing section), and the fifth battery housing portion 34 is included in a third battery housing section 8-3 (a forward-lower battery housing section), as shown in FIG. 3, for example. In a preferred embodiment, a width of the first battery housing section 8-1 is equal or substantially equal to a width of the second battery housing section 8-2, and a width of the third battery housing section 8-3 is less than a width of the first battery housing section 8-1 and a width of the second battery housing section 8-2. Preferably, a rear surface of the third battery housing section 8-3 is spaced away from a front surface of the first battery housing section 8-1. In a preferred embodiment, a rear surface of the second battery housing section 8-2 intersects a middle portion of the first battery housing section 8-1 in a front-rear direction of the electric vehicle in a top view and a side view.

As shown in FIGS. 4, 5A, and 5B, each of the first battery housing portion 26, the second battery housing portion 28, the third battery housing portion 30, the fourth battery housing portion 32, and the fifth battery housing portion 34 includes a plurality of battery housing module compartments, which are each to receive a battery module. In a preferred embodiment, each of the third battery housing portion 30 and the fourth battery housing portion 32 includes more battery housing module compartments than each of the first battery housing portion 26 and the second battery housing portion 28. Preferably, the fifth battery housing portion 34 includes less battery housing module compartments than each of the first battery housing portion 26 and the second battery housing portion 28.

Figure 6A:
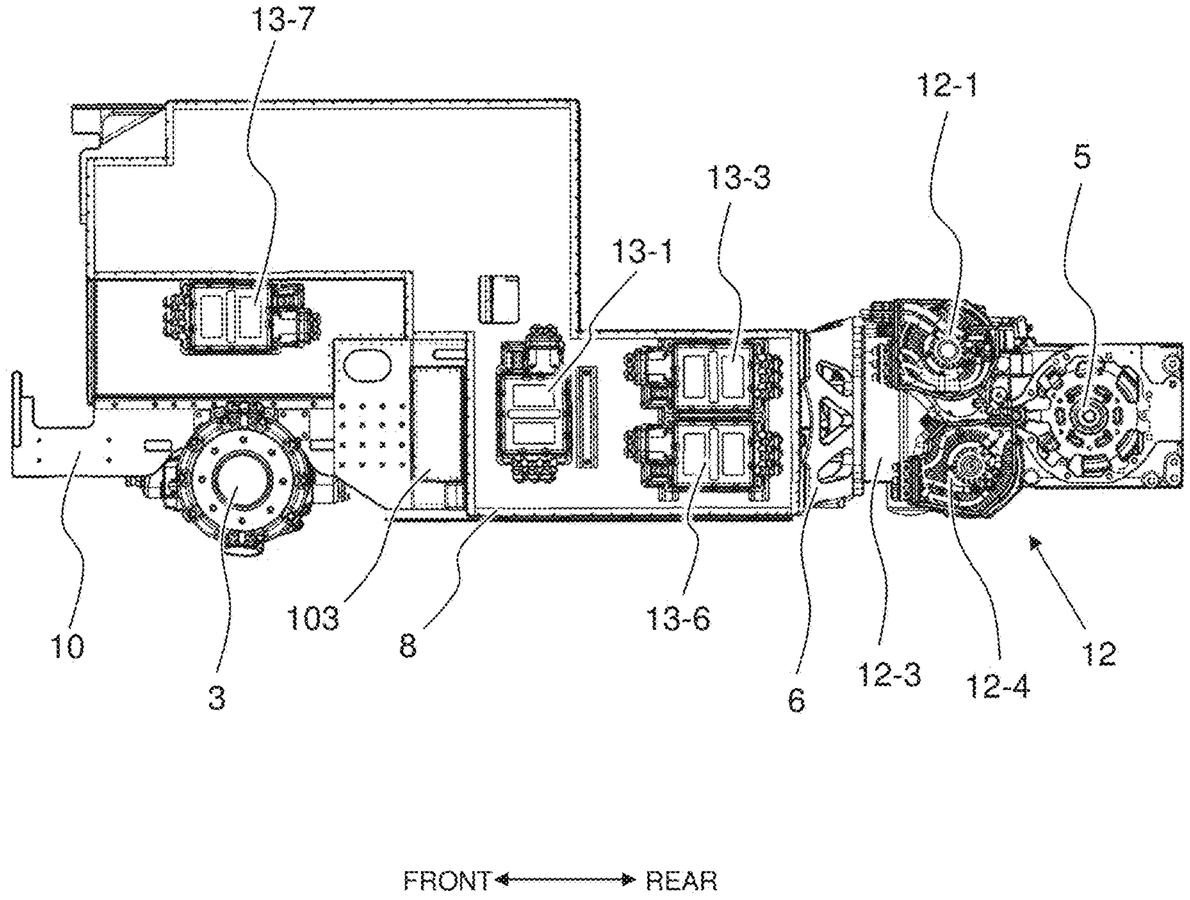
FIG. 6A shows a left side view of an intermediate frame, a battery housing, a front frame, and a rear frame of an electric vehicle according to a preferred embodiment of the present invention.
Figure 6B:
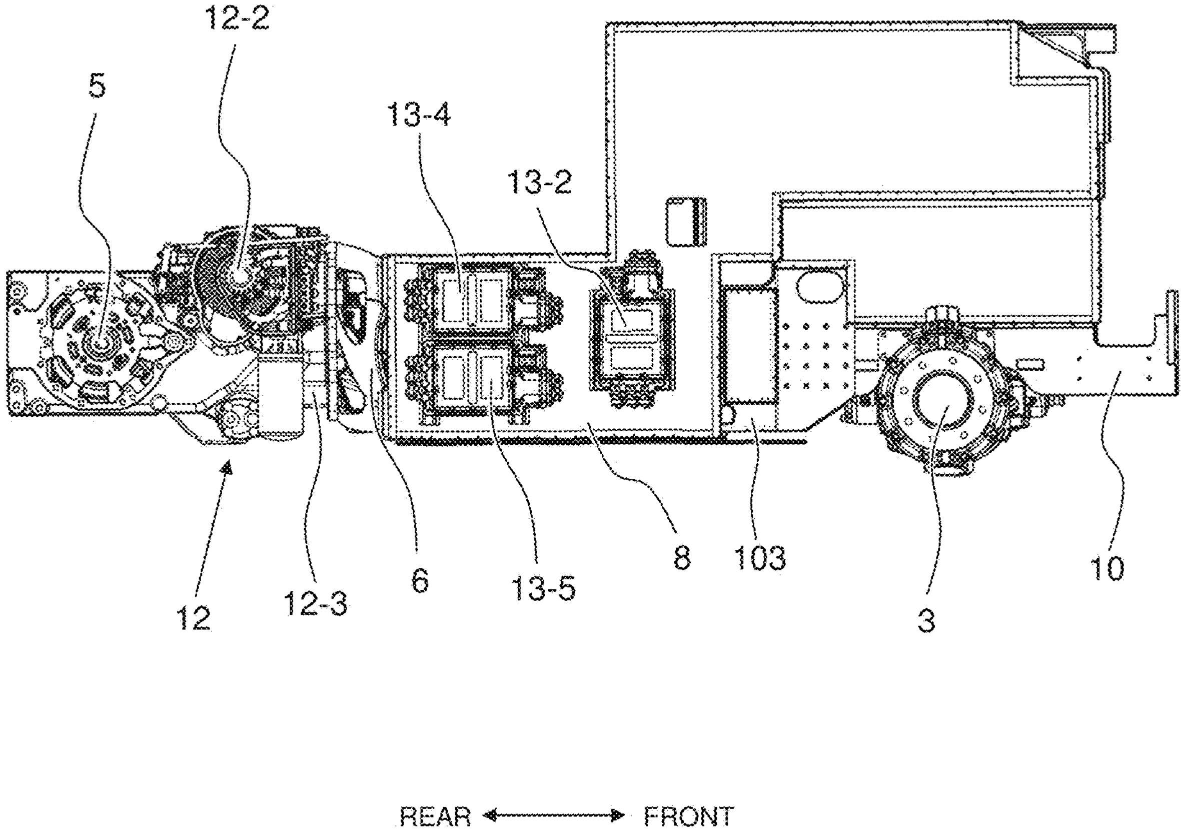
FIG. 6B shows a right side view of an intermediate frame, a battery housing, a front frame, and a rear frame of an electric vehicle according to a preferred embodiment of the present invention.

FIGS. 6A and 6B show, respectively, left and right side views of the intermediate frame 6, the battery housing 8, the front frame 10, and the rear frame 12 shown in FIG. 2, for example. A front portion of the intermediate frame 6 is attached to a rear portion of the battery housing 8, and a rear portion of the intermediate frame 6 is attached to a front portion of the rear frame 12. As shown in FIGS. 6A and 6B, the intermediate frame 6 is located between the battery housing 8 and the rear axle 5 in the front-rear direction of the vehicle 1. A chassis of the vehicle 1 can include the intermediate frame 6 and the front frame 10.

As described above, the rear frame 12 can include the first motor housing portion 12-1 to house the third electric motor 18, the second motor housing portion 12-2 to house the fourth electric motor 20, the third motor housing portion 12-3 to house the fifth electric motor 22, and the fourth motor housing portion 12-4 to house the sixth electric motor 24. In a preferred embodiment of the present invention, as shown, for example, in FIGS. 6A and 6B, the first motor housing portion 12-1, the second motor housing portion 12-2, the third motor housing portion 12-3, and the fourth motor housing portion 12-4 are preferably located in a rearward direction of the intermediate frame 6. Accordingly, each of the third electric motor 18, the fourth electric motor 20, the fifth electric motor 22, and the sixth electric motor 24 are preferably located rearwardly of the intermediate frame 6 in a front-rear direction of the vehicle 1.

In a preferred embodiment of the present invention, as shown, for example, in FIGS. 6A and 6B, one or more inverters 13 are connected to, attached on, or supported by the battery housing 8. For example, the one or more inverters 13 can include a first inverter 13-1, a second inverter 13-2, a third inverter 13-3, a fourth inverter 13-4, a fifth inverter 13-5, a sixth inverter 13-6, and a seventh inverter 13-7. Preferably, as shown in FIG. 6A, the first inverter 13-1, the third inverter 13-3, the sixth inverter 13-6, and the seventh inverter 13-7 are located on a left side of the battery housing 8. Preferably, as shown in FIG. 6B, the second inverter 13-2, the fourth inverter 13-4, and the fifth inverter 13-5 are located on a right side of the battery housing 8. More specifically, as shown in FIGS. 6A and 6B, the seventh inverter 13-7 can be attached to a left side cover of the fifth battery housing portion 34, each of the first inverter 13-1, the third inverter 13-3, and the sixth inverter 13-6 can be attached to a left side cover of the second battery housing portion 28, and each of the second inverter 13-2, the fourth inverter 13-4, and the fifth inverter 13-5 can be attached to a right side cover of the first battery housing portion 26. However, the total number of the inverters 13 is not limited, and the inverters 13 may be provided at other locations within the vehicle 1.

In preferred embodiment of the present invention, the first inverter 13-1 can provide electric power to the first electric motor 14, the second inverter 13-2 can provide electric power to the second electric motor 16, the third inverter 13-3 can provide electric power to the third electric motor 18, the fourth inverter 13-4 can provide electric power to the fourth electric motor 20, the fifth inverter 13-5 can provide electric power to the fifth electric motor 22, and the sixth inverter 13-6 can provide electric power to the sixth electric motor 24. The seventh inverter 13-7 can provide electric power to other components of the electric vehicle 1, for example, a cooling structure such as a radiator/condenser fan 111 shown in FIG. 13.

Figure 7A:
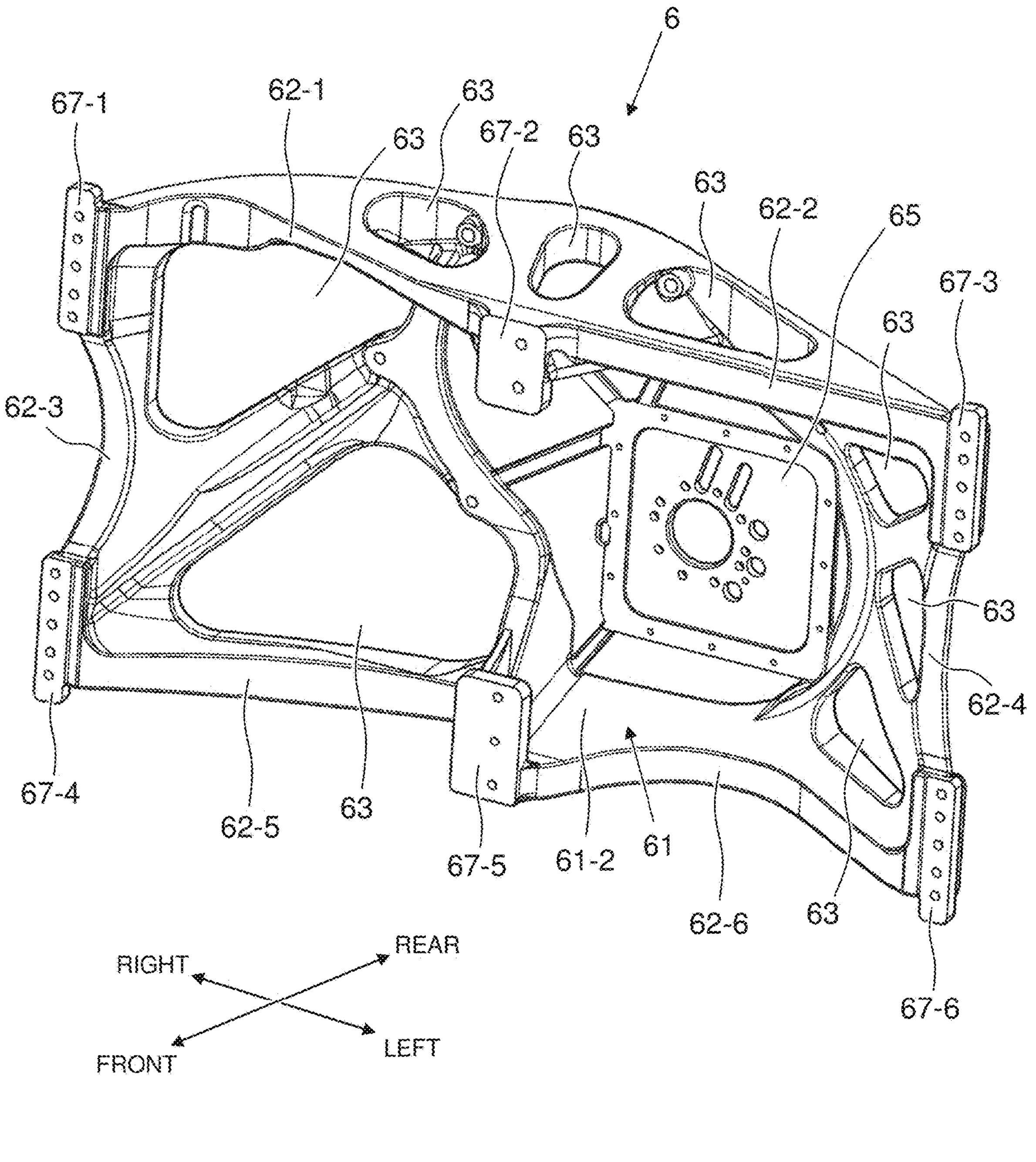
FIG. 7A shows a perspective left-front view of an intermediate frame of an electric vehicle according to a preferred embodiment of the present invention.
Figure 7B:
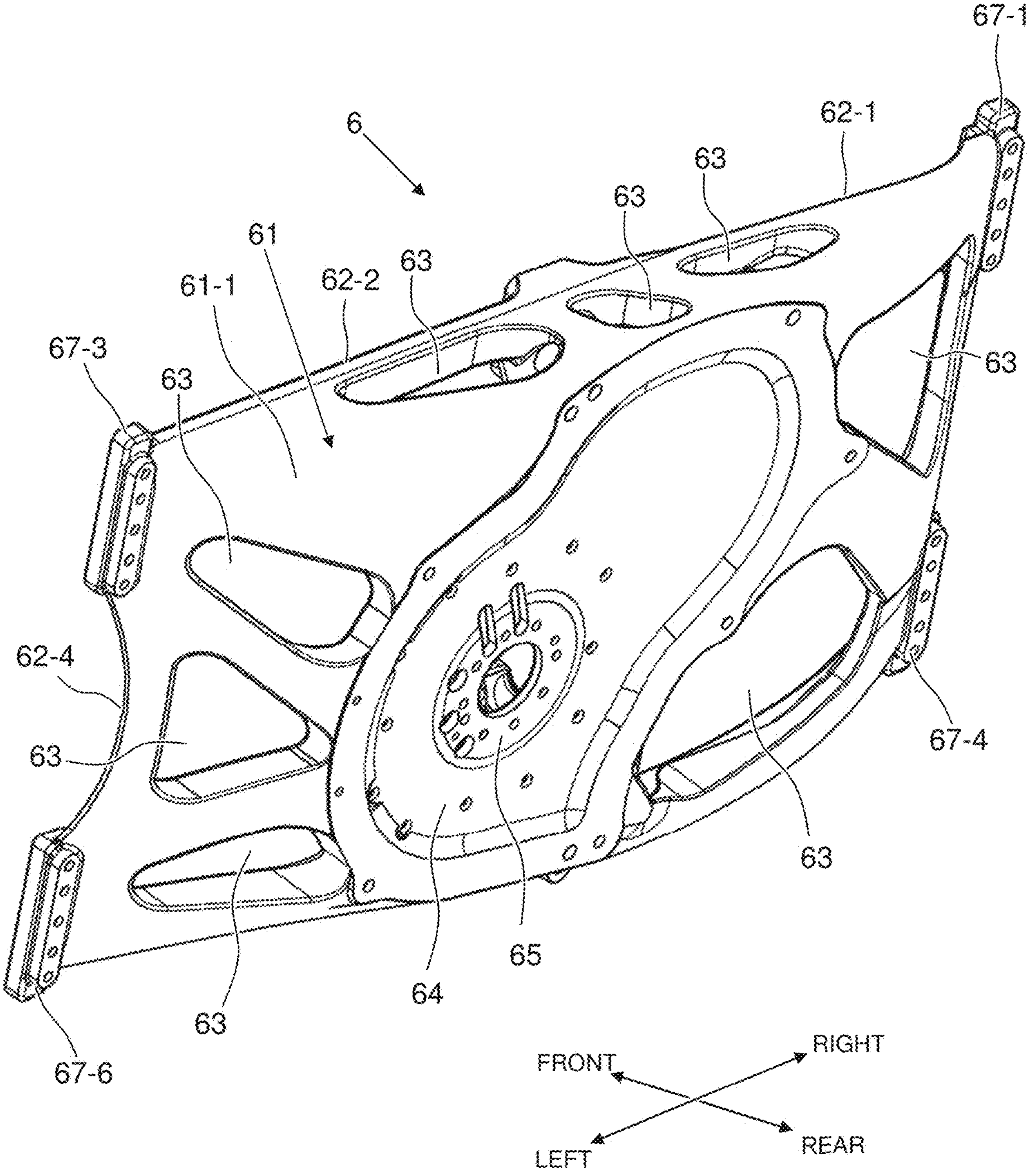
FIG. 7B shows a perspective left-rear view of an intermediate frame of an electric vehicle according to a preferred embodiment of the present invention.
Figure 8A:
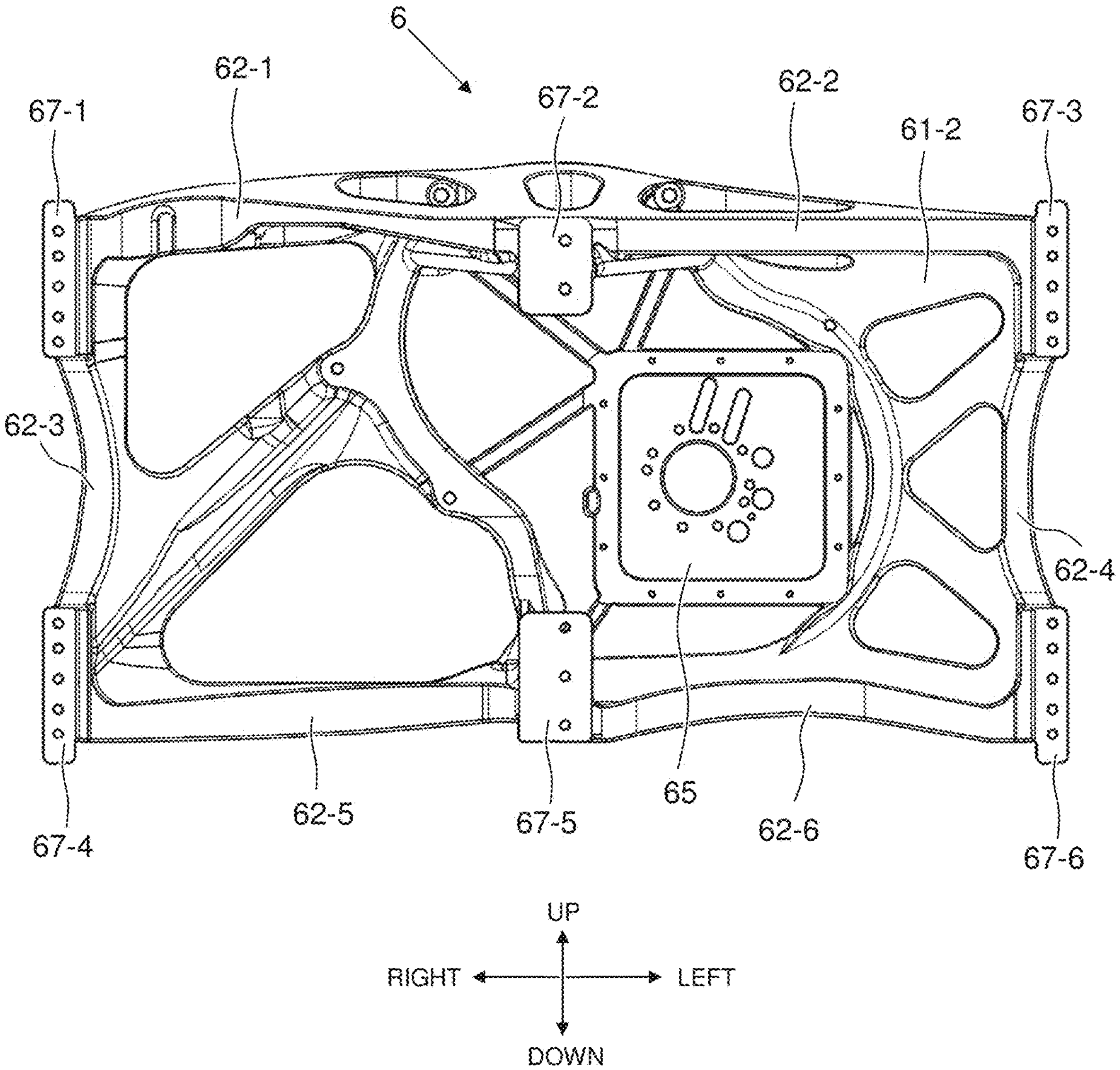
FIG. 8A shows a front view of an intermediate frame of an electric vehicle according to a preferred embodiment of the present invention.
Figure 8B:
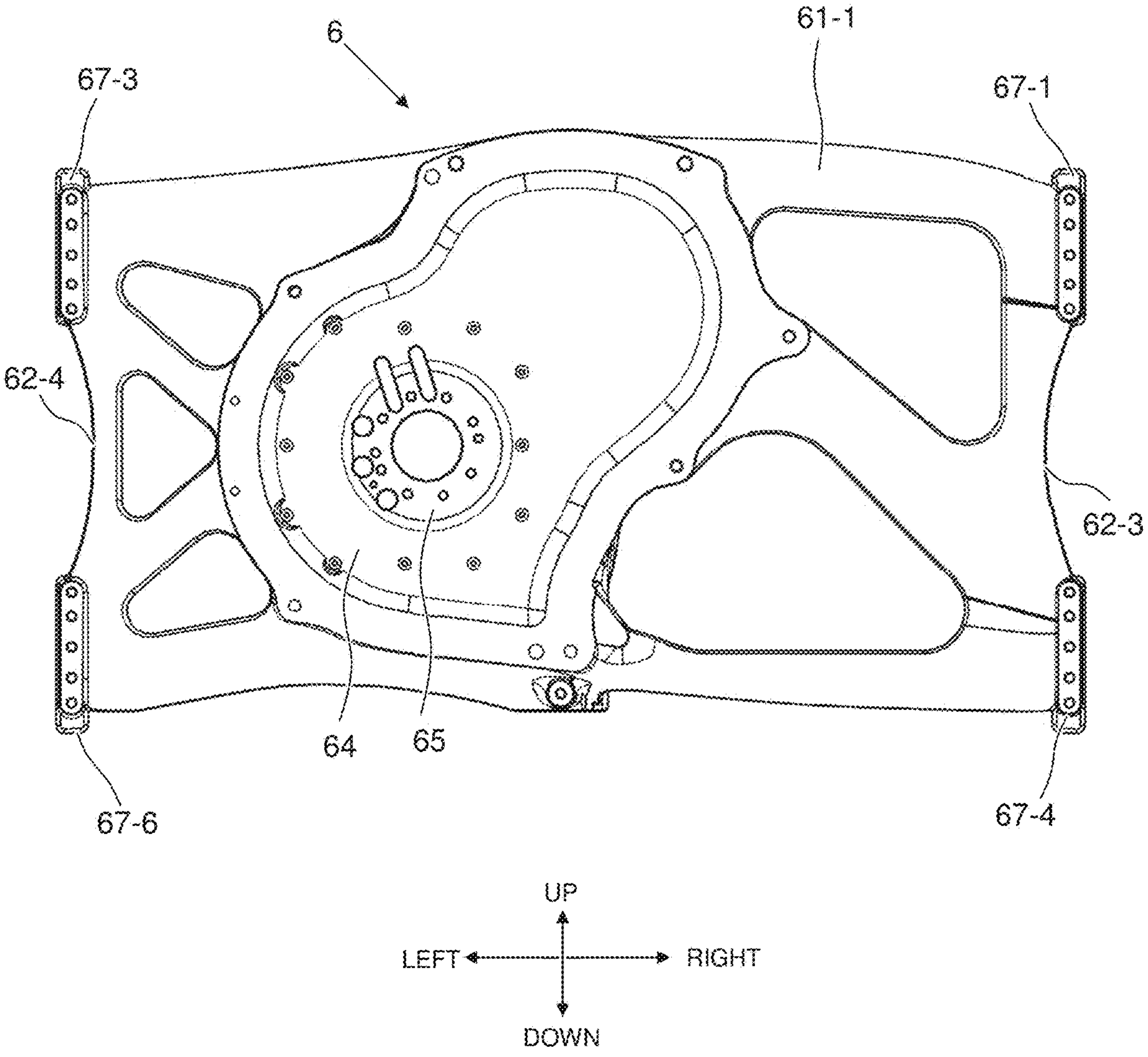
FIG. 8B shows a rear view of an intermediate frame of an electric vehicle according to a preferred embodiment of the present invention.
Figure 8C:
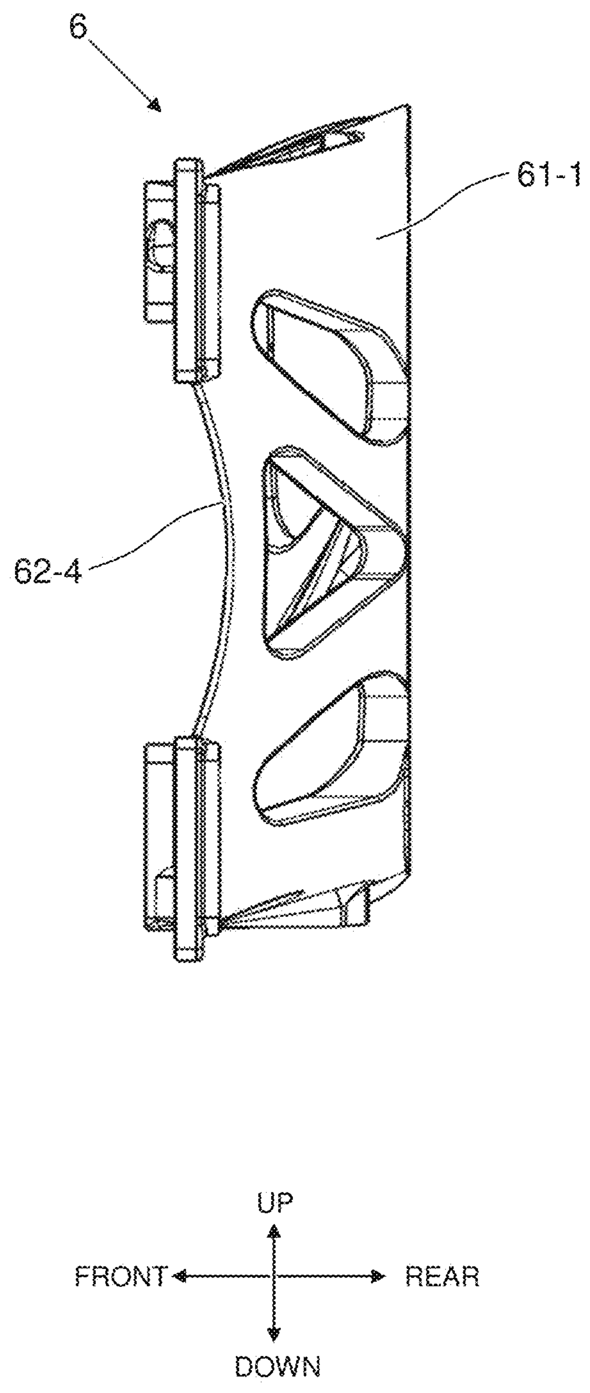
FIG. 8C shows a left side view of an intermediate frame of an electric vehicle according to a preferred embodiment of the present invention.
Figure 8D:
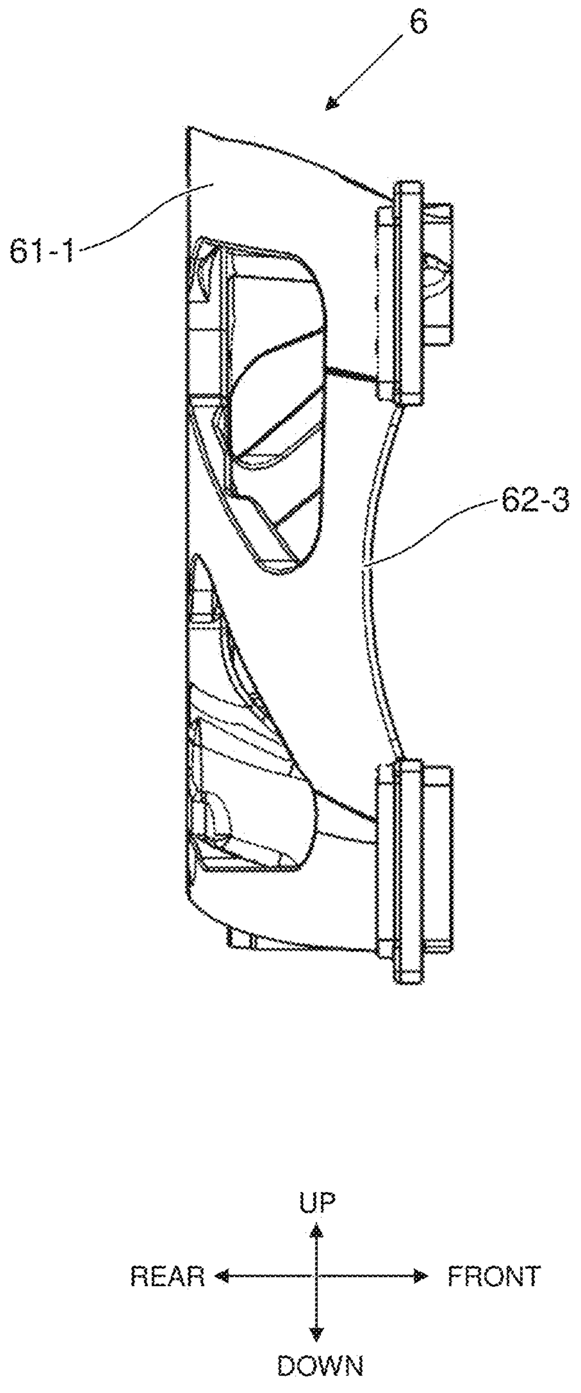
FIG. 8D shows a right side view of an intermediate frame of an electric vehicle according to a preferred embodiment of the present invention.
Figure 8E:
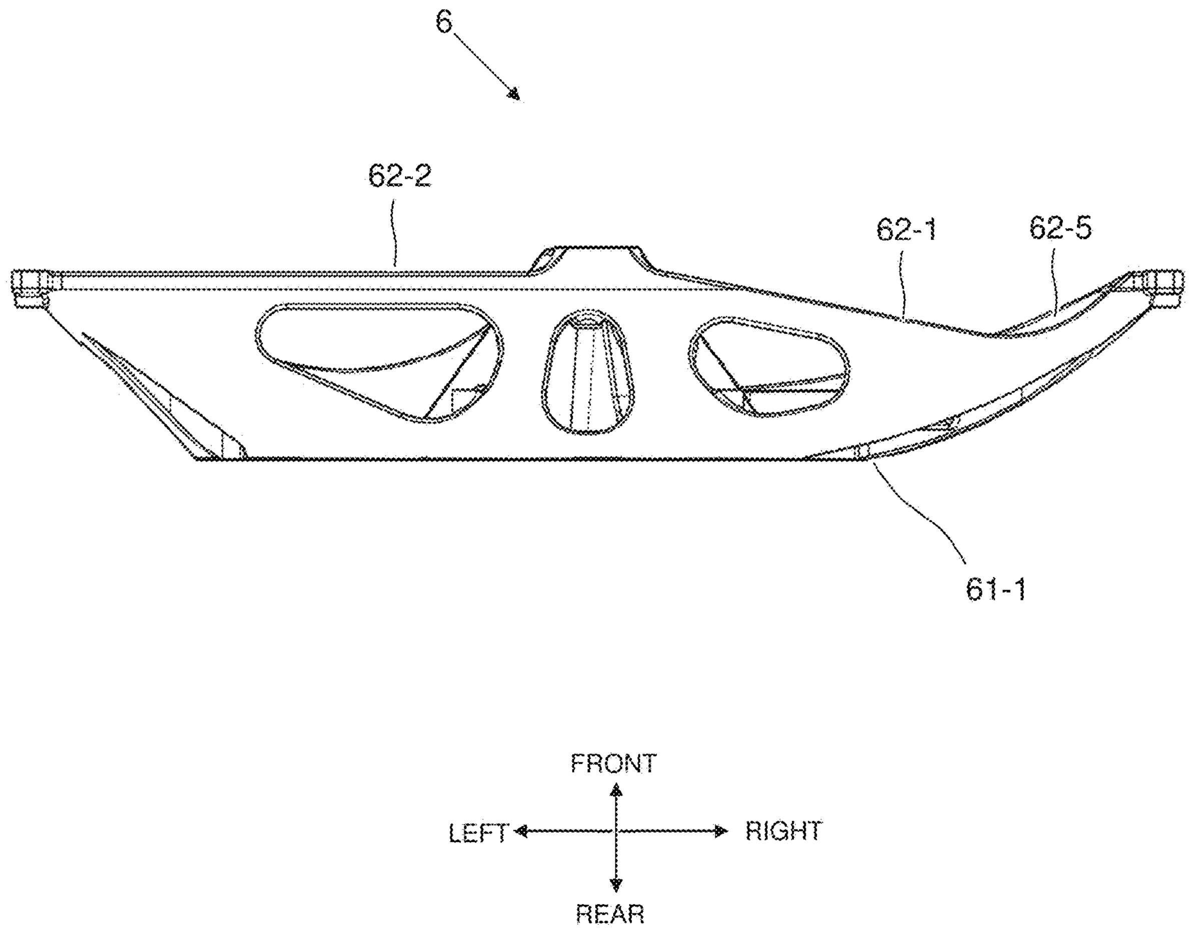
FIG. 8E shows a top view of an intermediate frame of an electric vehicle according to a preferred embodiment of the present invention.
Figure 8F:
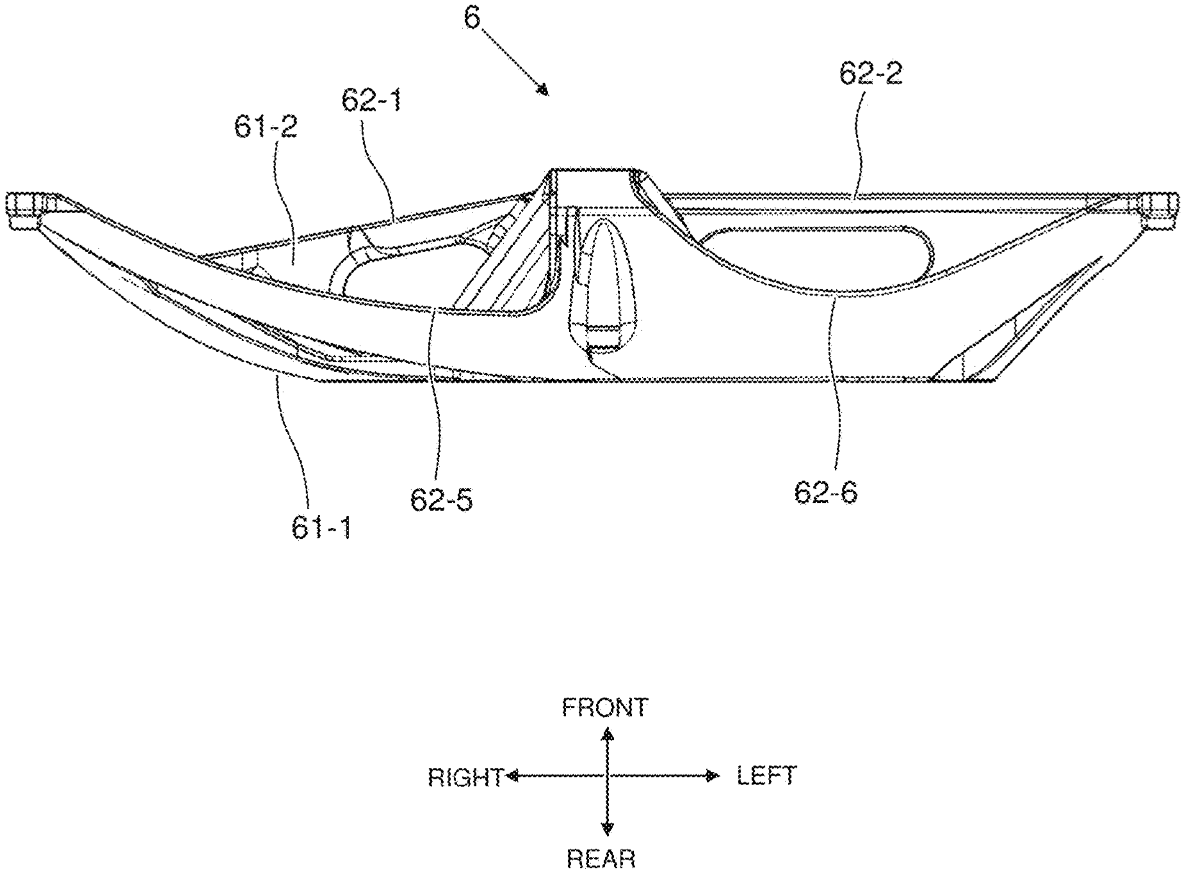
FIG. 8F shows a bottom view of an intermediate frame of an electric vehicle according to a preferred embodiment of the present invention.

FIG. 7A shows a perspective left-front view of the intermediate frame 6, and FIG. 7B shows a perspective left-rear view of the intermediate frame 6. FIG. 8A shows a front view of the intermediate frame 6, FIG. 8B shows a rear view of the intermediate frame 6, FIG. 8C shows a left side view of the intermediate frame 6, FIG. 8D shows a right side view of the intermediate frame 6, FIG. 8E shows a top view of the intermediate frame 6, and FIG. 8F shows a bottom view of the intermediate frame 6.

In a preferred embodiment of the present invention, as shown, for example, in FIGS. 7A-8F, the intermediate frame 6 includes a main wall 61 with an exterior (rear) surface 61-1 and an interior (front) surface 61-2. The main wall 61 has a curved or rounded shape to distribute stress. The exterior surface 61-1 has a concave shape, and the interior surface 61-2 has a convex shape. The intermediate frame 6 includes an interior space that is defined by wall portions 62. The wall portions 62 can include a first upper wall portion 62-1, a second upper wall portion 62-2, a right wall portion 62-3, a left wall portion 62-4, a first lower wall portion 62-5, and a second lower wall portion 62-6. One or more of the wall portions 62 can be defined by an edge of the main wall 61.

According to a preferred embodiment of the present invention, for example, as shown in FIGS. 7A, 7B, 8A, and 8B, one or more bolting portions 67 can be provided along edges of the main wall 61. The bolting portions can include a first (upper-right) bolting portion 67-1, a second (upper-middle) bolting portion 67-2, a third (upper-left) bolting portion 67-3, a fourth (lower-right) bolting portion 67-4, a fifth (lower-middle) bolting portion 67-5, and a sixth (lower-left) bolting portion 67-6. That is, the intermediate frame 6 can include four bolting portions 67 at each of the four corners of the main wall 61 and two bolting portions at a middle portion of each of an upper edge and a lower edge of the main wall 61. Each of the bolting portions 67 can include one or more bolt holes, such that bolts can be inserted through the bolt holes to attach and secure the intermediate frame to battery housing 8.

According to a preferred embodiment of the present invention, for example, as shown in FIGS. 7A and 8A, the first upper wall portion 62-1 and the second upper wall portion 62-2 are spaced apart from each other by the second (upper-middle) bolting portion 67-2, and the first lower wall portion 62-5 and the second lower wall portion 62-6 are spaced apart from each other by the fifth (lower-middle) bolting portion 67-5.

According to a preferred embodiment of the present invention, at least one of the wall portions 62 is curved. For example, as shown in FIGS. 7A, 8A, and 8C-8F, each of the first upper wall portion 62-1, the right wall portion 62-3, the left wall portion 62-4, the first lower wall portion 62-5, and the second lower wall portion 62-6 has a curved shape. According to the shapes of the walls 61 and the wall portions 62, the intermediate frame 6 can have an asymmetrical shape in a plan view.

According to a preferred embodiment of the present invention, the intermediate frame 6 can also include one or more openings 63. As shown in FIGS. 7A and 7B, openings 63 can be provided in the main wall 61 and can be located along one or more of the first upper wall portion 62-1, the second upper wall portion 62-2, the right wall portion 62-3, the left wall portion 62-4, the first lower wall portion 62-5, and the second lower wall portion 62-6. The openings 63 can permit the passage of cables, coolant lines, refrigerant lines, oil lines, and the like, as described below with respect to FIGS. 10A and 10B.

In a preferred embodiment of the present invention, as shown, for example, in FIGS. 7B and 8B, the intermediate frame 6 can include a depression 64 on the exterior (rear) surface 61-1. The third motor housing portion 12-3 can be fitted to the depression 64, and at least a portion of an outer shape or perimeter of the depression 64 can match or follow a shape of a mounting face of the third motor housing portion 12-3. The intermediate frame 6 further includes a motor mount 65, which can be circumscribed by the depression 64. The fifth electric motor 22 can be mounted to the intermediate frame 6 at the motor mount 65, as shown in FIG. 10B. The motor mount 65 can include a shape that matches or follows a shape of a perimeter of the fifth electric motor 22. At least a portion of the outer shape or perimeter of the depression 64 or the shape of the motor mount 65 can at least partially match or follow a perimeter of a gearing, for example, the fifth gearing 23 or a reduction gear connected to the fifth electric motor 22.

Figure 9A:
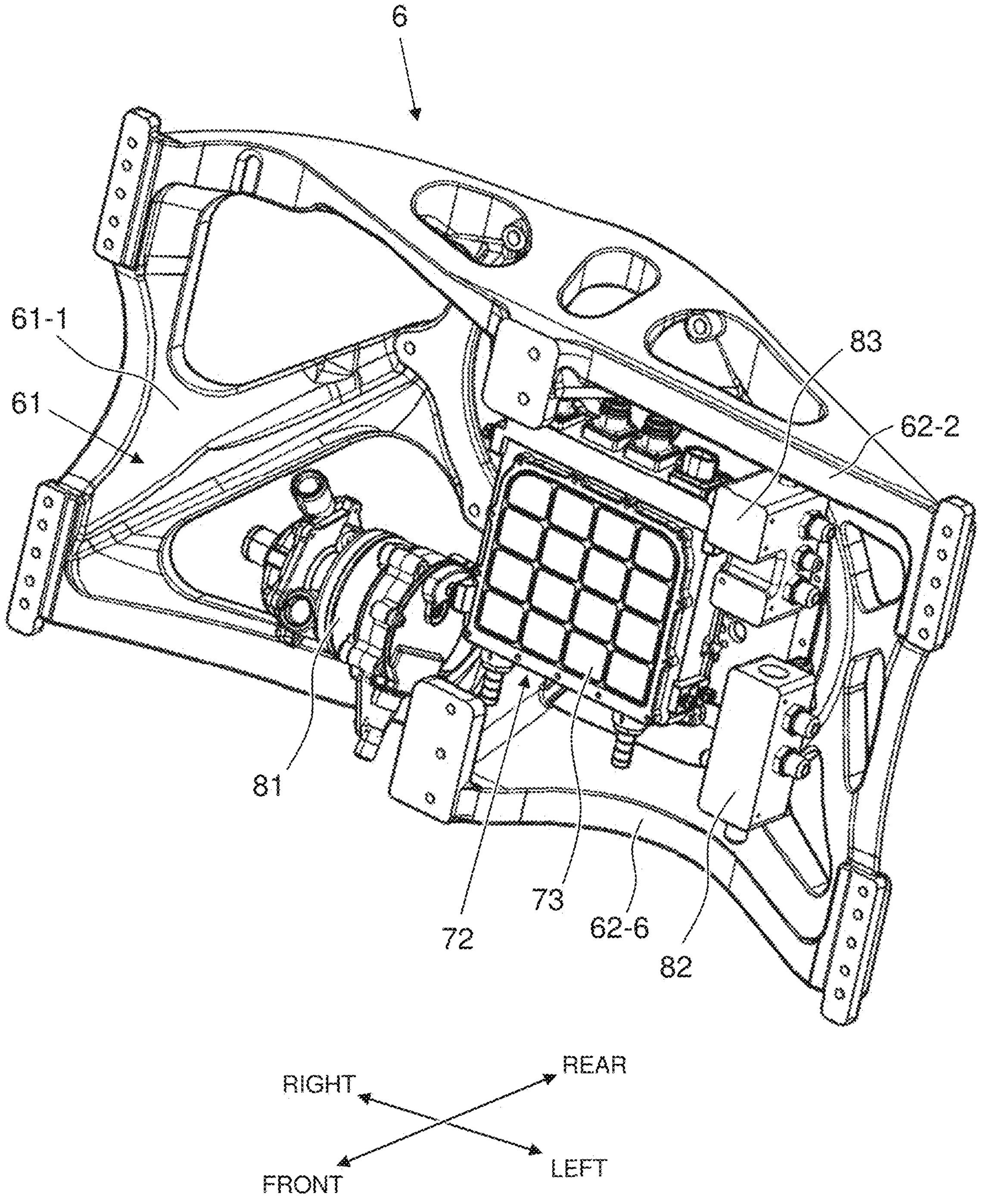
FIG. 9A shows a perspective left-front view of an intermediate frame housing components of an electric vehicle according to a preferred embodiment of the present invention.
Figure 9B:
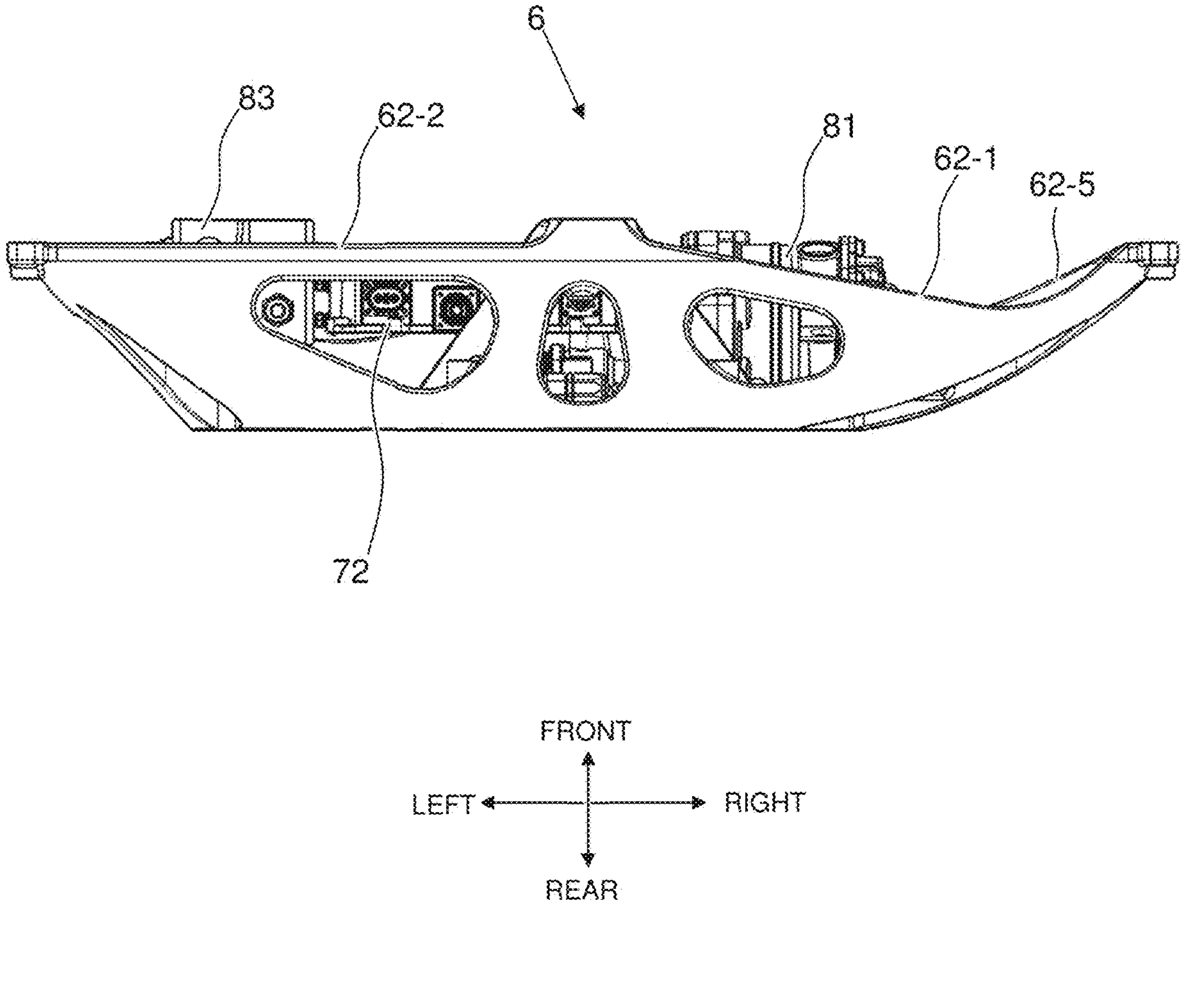
FIG. 9B shows a top view of an intermediate frame housing components of an electric vehicle according to a preferred embodiment of the present invention.

FIGS. 9A and 9B show a perspective left-front view and a top view of the intermediate frame 6 housing components of the vehicle 1.

In a preferred embodiment of the present invention, as shown, for example, in FIG. 9A, the intermediate frame 6 can house a converter 72, a pump 81, a first hydraulic manifold 82, and a second hydraulic manifold 83. Each of the converter 72, the pump 81, the first hydraulic manifold 82, and the second hydraulic manifold 83 can be partially or completely located within the space defined by the concave shape of the interior surface 61-1 of the main wall 61. For example, as shown in FIG. 9B, the converter 72 can be completely located within the space defined by the concave shape of the interior surface 61-1 of the main wall 61. However, the pump 81 can partially extend beyond each of the first upper wall portion 62-1 and the first lower wall portion 62-5, and the second hydraulic manifold 83 can partially extend beyond the second upper wall portion 62-2.

According to a preferred embodiment of the present invention, the converter 72 can include an electrical converter such as a DC-DC converter, for example, and the DC-DC converter can be a down-converter that converts a battery voltage of one or more batteries included in the battery housing 8 to a lower voltage. At least one surface of the converter 72 can be partially or completely covered by an isolation barrier 73, as shown in FIG. 9A. The isolation barrier 73 can be structured to include a flat or textured plate shape. The isolation barrier 73 can include an insulating material, for example, an electrically insulating material. Alternatively, or in addition, an isolation barrier can be provided that partially or completely spans between the second upper wall portion 62-2 and the second lower wall portion 62-6. In another preferred embodiment of the present invention, the converter 72 can be replaced with another electrical component.

According to a preferred embodiment of the present invention, the pump 81 can be a coolant pump. The first hydraulic manifold 82 can be provided to control a distribution of coolant, and the second hydraulic manifold 83 can be provided to control a return of the coolant. The first hydraulic manifold 82 and the second hydraulic manifold 83 can each include one or more direction control valves. As one example, the coolant can be water.

Figure 10A:
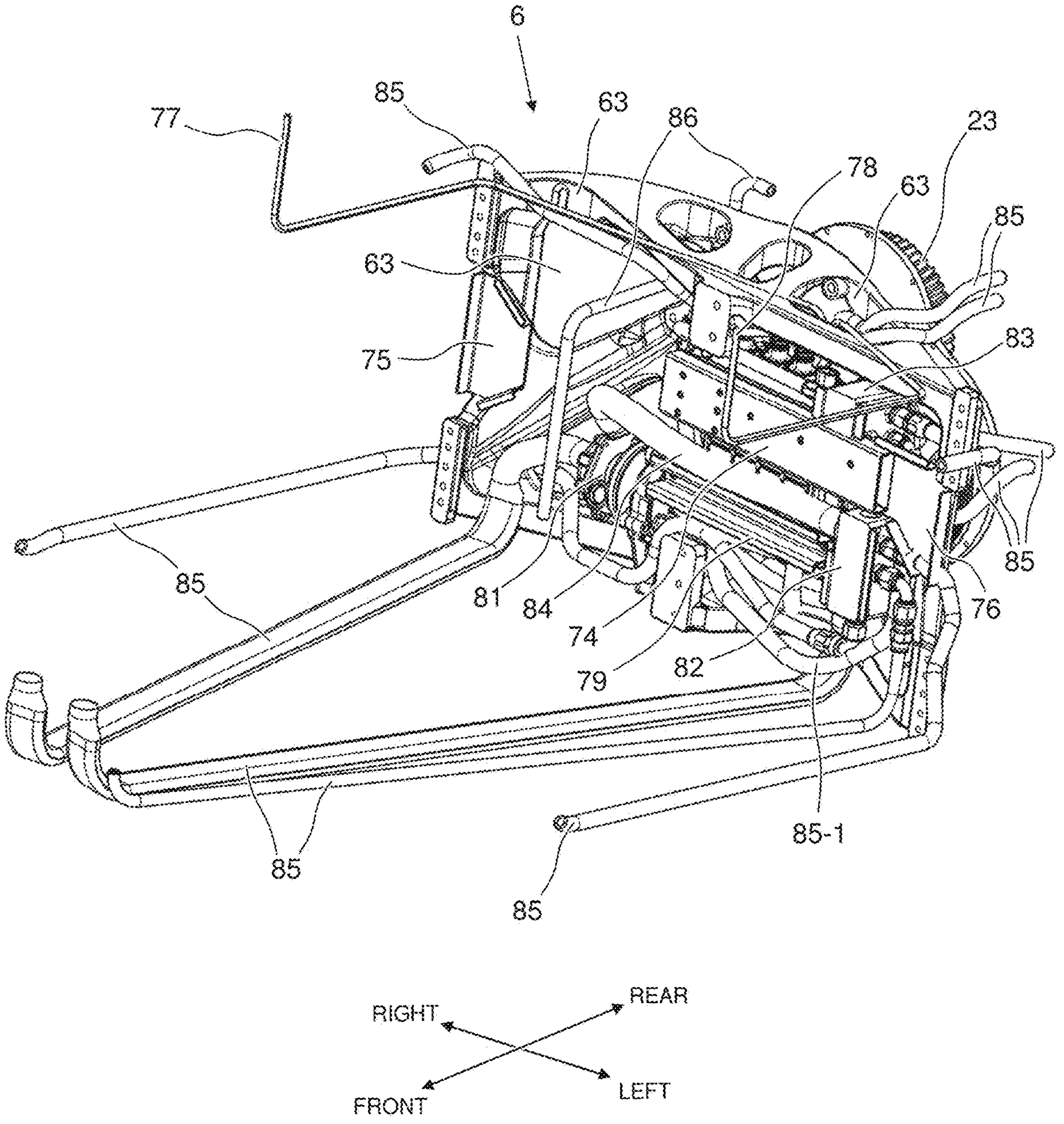
FIG. 10A shows a perspective left-front view of an intermediate frame housing components of an electric vehicle and connections to the components according to a preferred embodiment of the present invention.
Figure 10B:
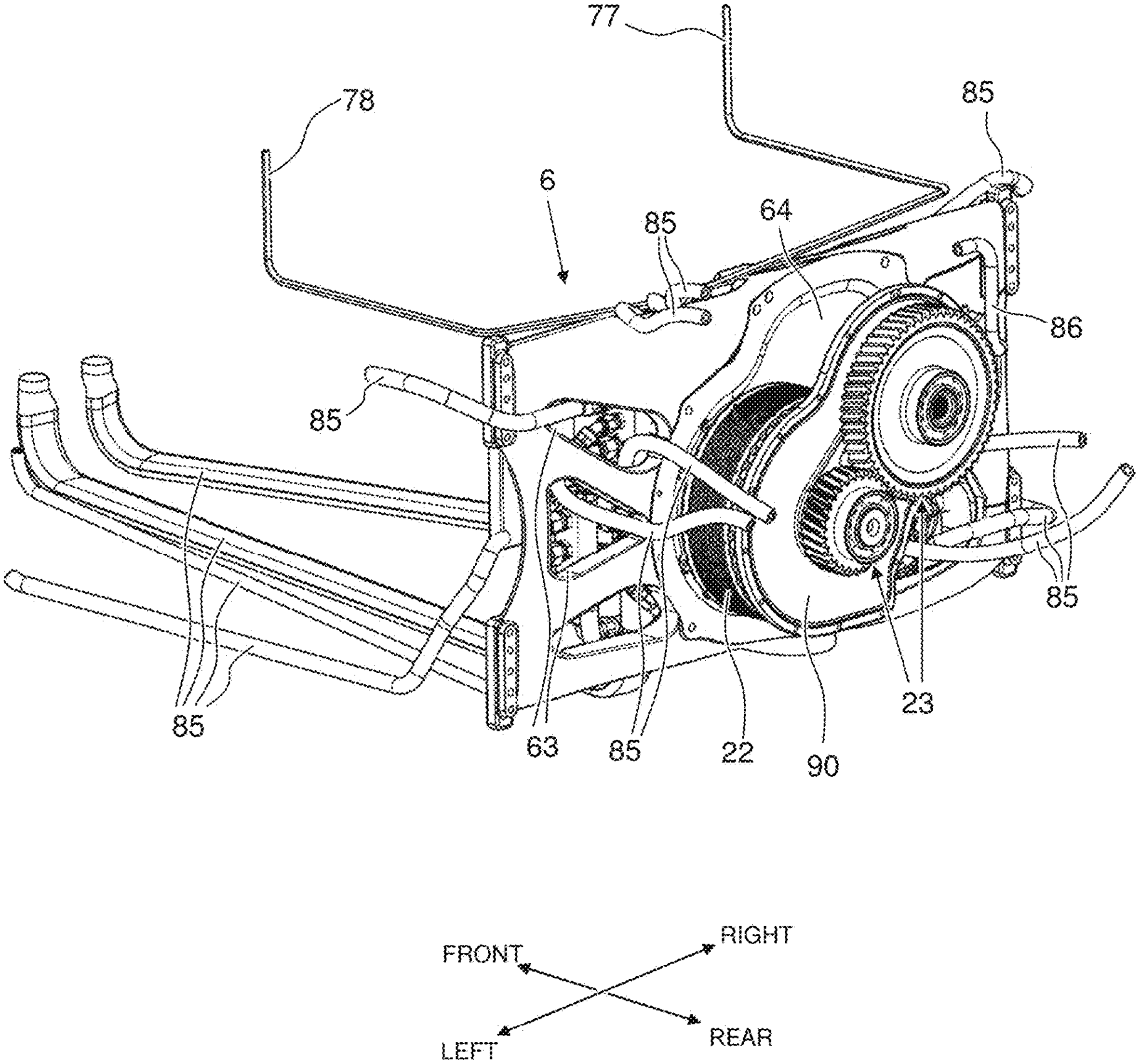
FIG. 10B shows a perspective left-rear view of an intermediate frame housing components of an electric vehicle and connections to the components according to a preferred embodiment of the present invention.

FIGS. 10A and 10B show a perspective left-front view and perspective left-rear view of connections to the components housed in the intermediate frame 6 of the vehicle 10.

In a preferred embodiment of the present invention, as shown, for example, in FIG. 10A, a duct channel 74 and covers 75 and 76 can be connected to or supported by the intermediate frame 6. The duct channel 74 can be provided in front of the converter 72, and the duct channel 74 can provide a passage for electrical cables or the like. The covers 75 and 76 can also provide protection for electrical cables or the like. According to a preferred embodiment of the present invention, the duct channel 74 and the covers 75 and 76 guide electrical cables or battery strings. The intermediate frame 6 can also be provided with a bracket 79, as shown in FIG. 10A. The bracket 79 can fix and secure the converter 72 within the intermediate frame 6.

In a preferred embodiment of the present invention, as shown, for example, in FIGS. 10A and 10B, first and second electrical cables 77 and 78 can pass through one of the openings 63 of the intermediate frame 6. The first electrical cable 77 can be a positive (+) connection from the converter 72 to a power distribution unit or the like. The second electrical cable 78 can be a negate (−) connection from the converter 72 to a power distribution unit or the like. Additional electrical cables can be located in and/or pass through the intermediate frame 6. For example, one or more of the openings 63 of the intermediate frame 6 can provide a passage for an electrical cable connected between one of the inverters 13 and one of the third electric motor 18, the fourth electric motor 20, the fifth electric motor 22, and the sixth electric motor 24.

In a preferred embodiment of the present invention, as shown, for example, in FIG. 10A, the intermediate frame 6 can house a supply coolant line 84 that supplies coolant from the pump 81 to the first hydraulic manifold 82. A plurality of inlet, outlet, return, and/or distribution coolant lines 85 can be connected to one or more of the pump 81, the first hydraulic manifold 82, and the second hydraulic manifold 83. One or more of the coolant lines 85 can pass through one or more of the openings 63 of the intermediate frame 6. At least one of the coolant lines 85-1 can be provided to supply coolant to the converter 72. As one example, the coolant can be water.

According to a preferred embodiment of the present invention, one or more further coolant or refrigerant lines 86 can pass through one or more of the openings 63 of the intermediate frame 6 without being directly connected to any of the pump 81, the first hydraulic manifold 82, and the second hydraulic manifold 83. For example, the one or more further coolant or refrigerant lines 86 can be connected between a heat exchanger and a component to be cooled.

In a preferred embodiment of the present invention, as shown, for example, in FIG. 10B, the fifth electric motor 22 is mounted to the intermediate frame 6 at the motor mount 65 (shown in FIGS. 7B and 8B). The fifth electric motor 22 is connected to the fifth gearing 23, and the fifth gearing 23 can drive an electric vehicle component, for example, a power take-off (PTO) component. As shown in FIG. 10B, a plate 90 at least partially cover the fifth electric motor 22. The plate 90 can be provided between the fifth electric motor 22 and the fifth gearing 23. The plate 90 can define a bearing block or a bearing carrier.

Figure 11A:
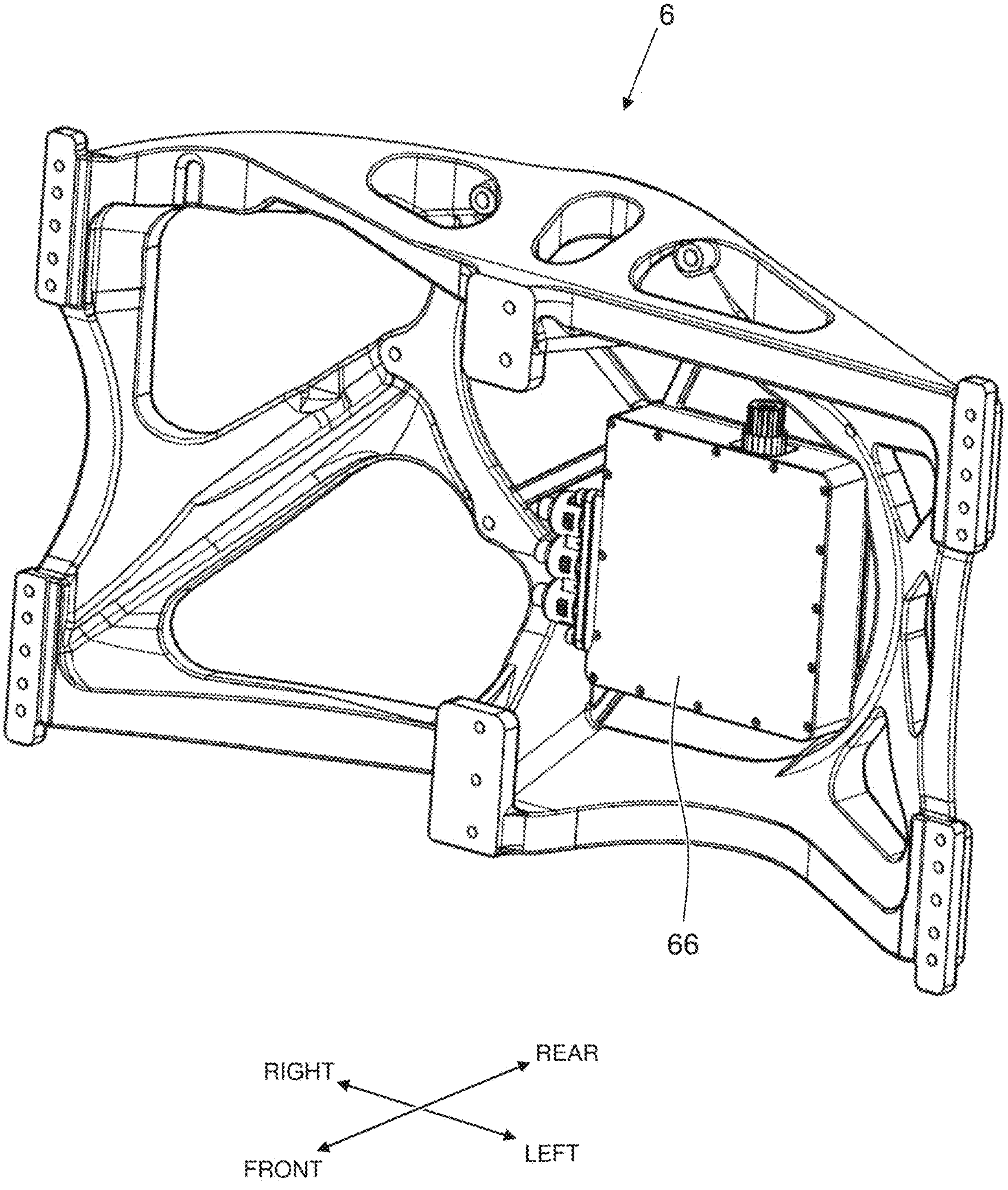
FIG. 11A shows a perspective left-front view of an intermediate frame of an electric vehicle that includes a motor cover according to a preferred embodiment of the present invention.
Figure 11B:
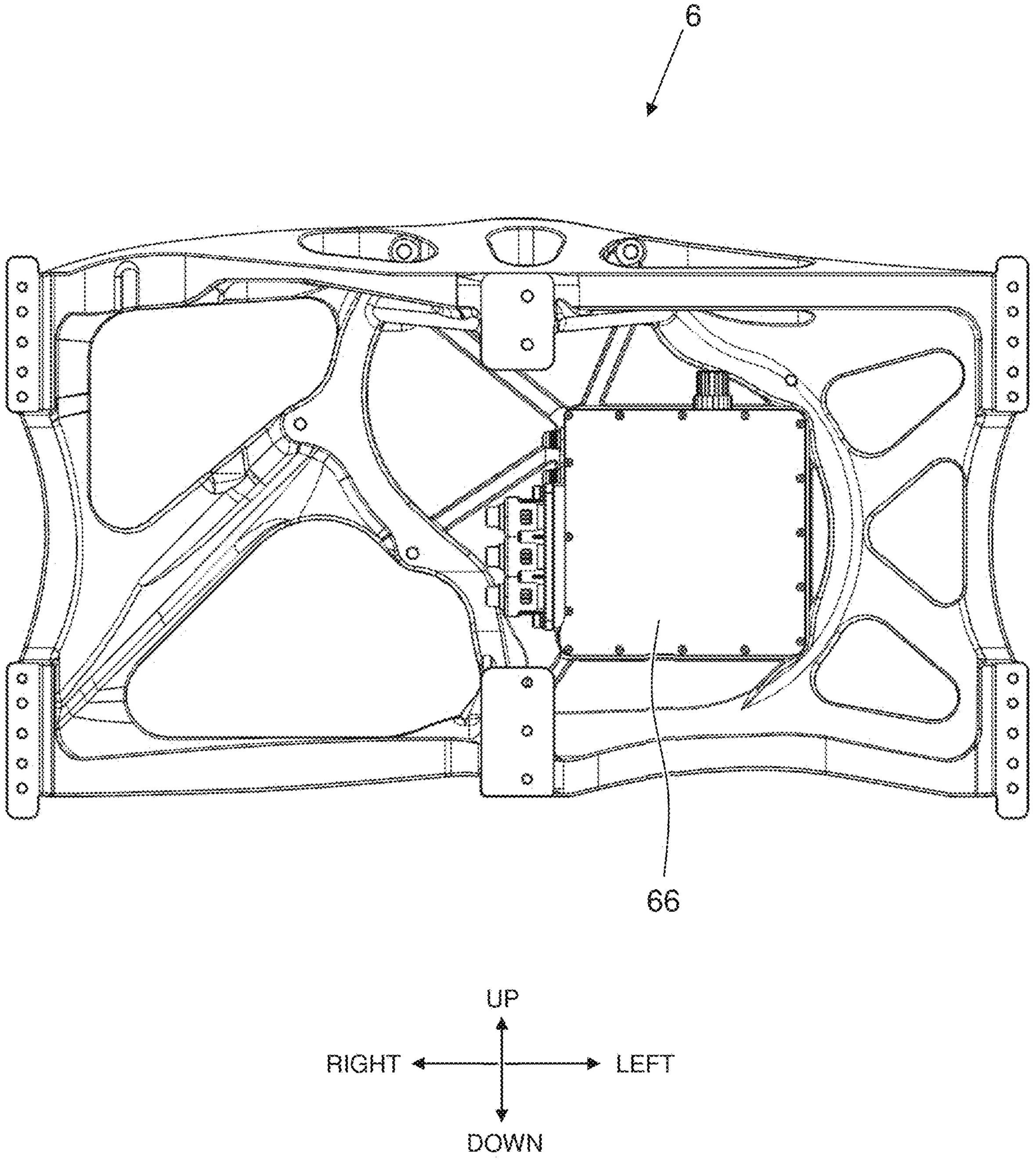
FIG. 11B shows a front view of an intermediate frame of an electric vehicle that includes a motor cover according to a preferred embodiment of the present invention.

FIGS. 11A and 11B show a perspective left-front view and a front view of a motor cover 66 housed within the intermediate frame 6.

In a preferred embodiment of the present invention, as shown, for example, in FIGS. 11A and 11B, the motor cover 66 can be located on the interior (front) surface 61-2 of the main wall 61 to cover a portion of the motor mount 65 that is located at the interior (front) surface 61-2 of the main wall 61. The motor cover 66 can isolate and protect the converter 72 from the fifth electric motor 22 and from mounting components for the fifth electric motor 22.

Figure 12A:
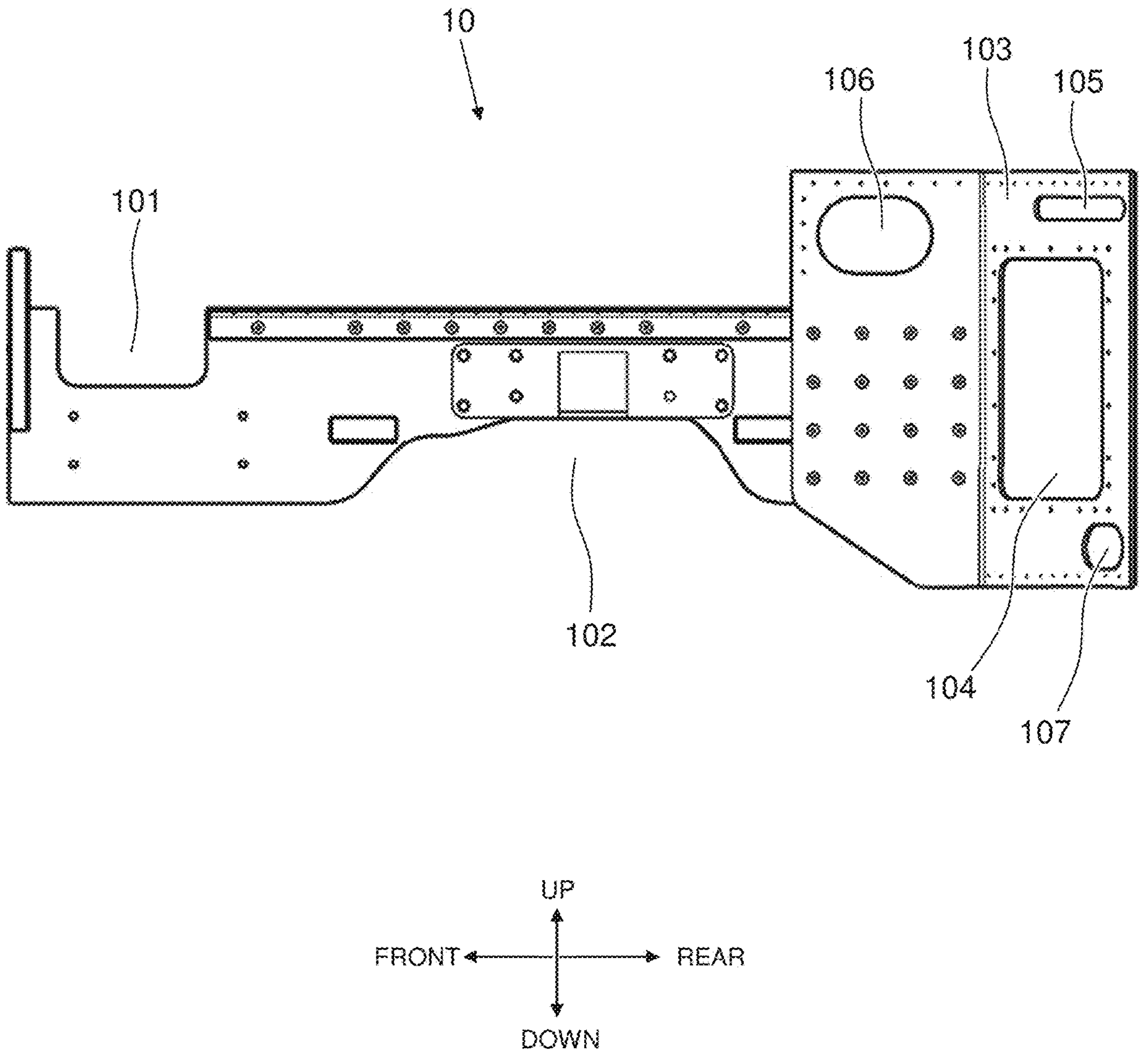
FIG. 12A shows a left side view of a front frame of an electric vehicle according to a preferred embodiment of the present invention.
Figure 12B:
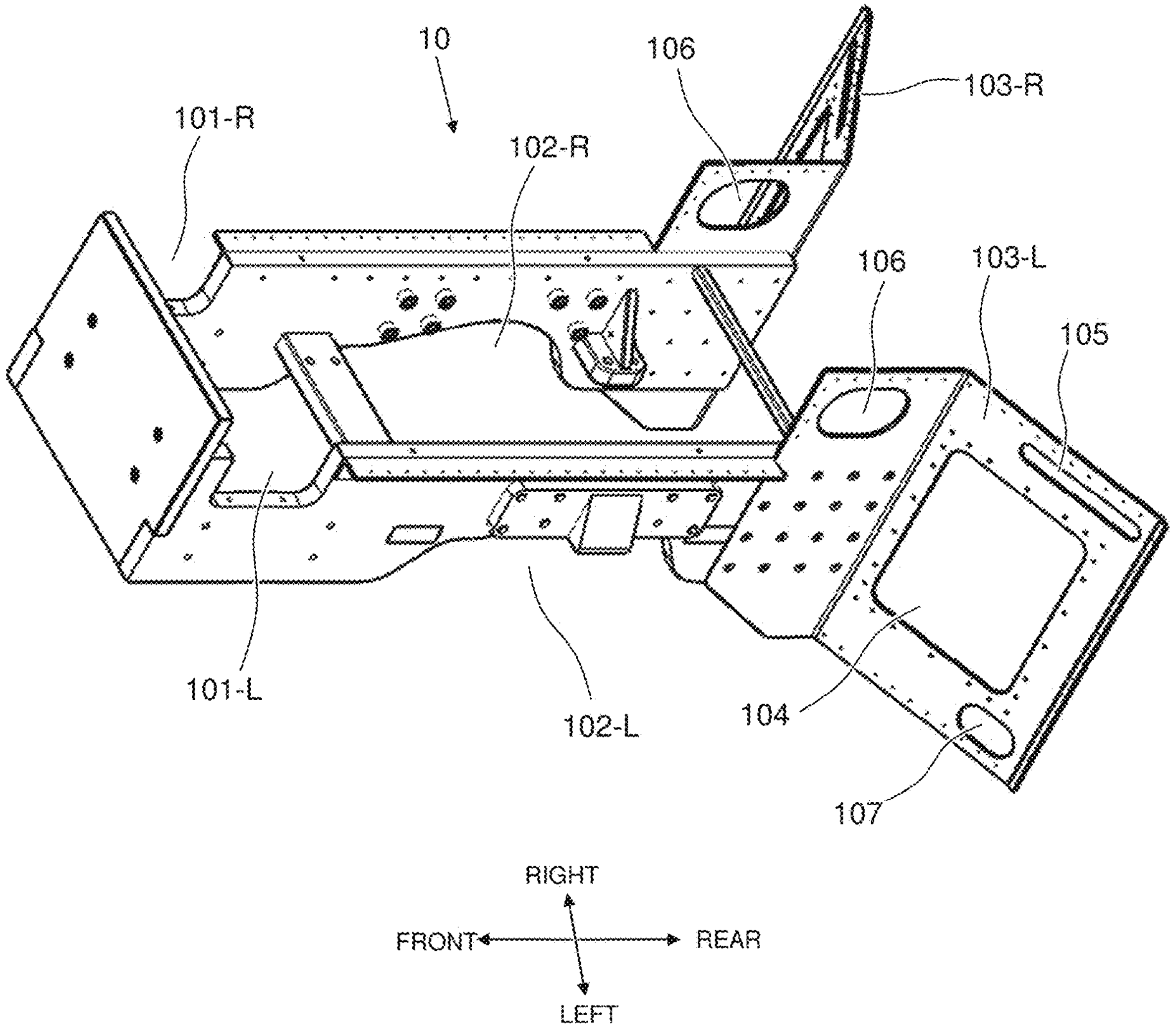
FIG. 12B shows a perspective left-front view of a front frame of an electric vehicle according to a preferred embodiment of the present invention.
Figure 12C:
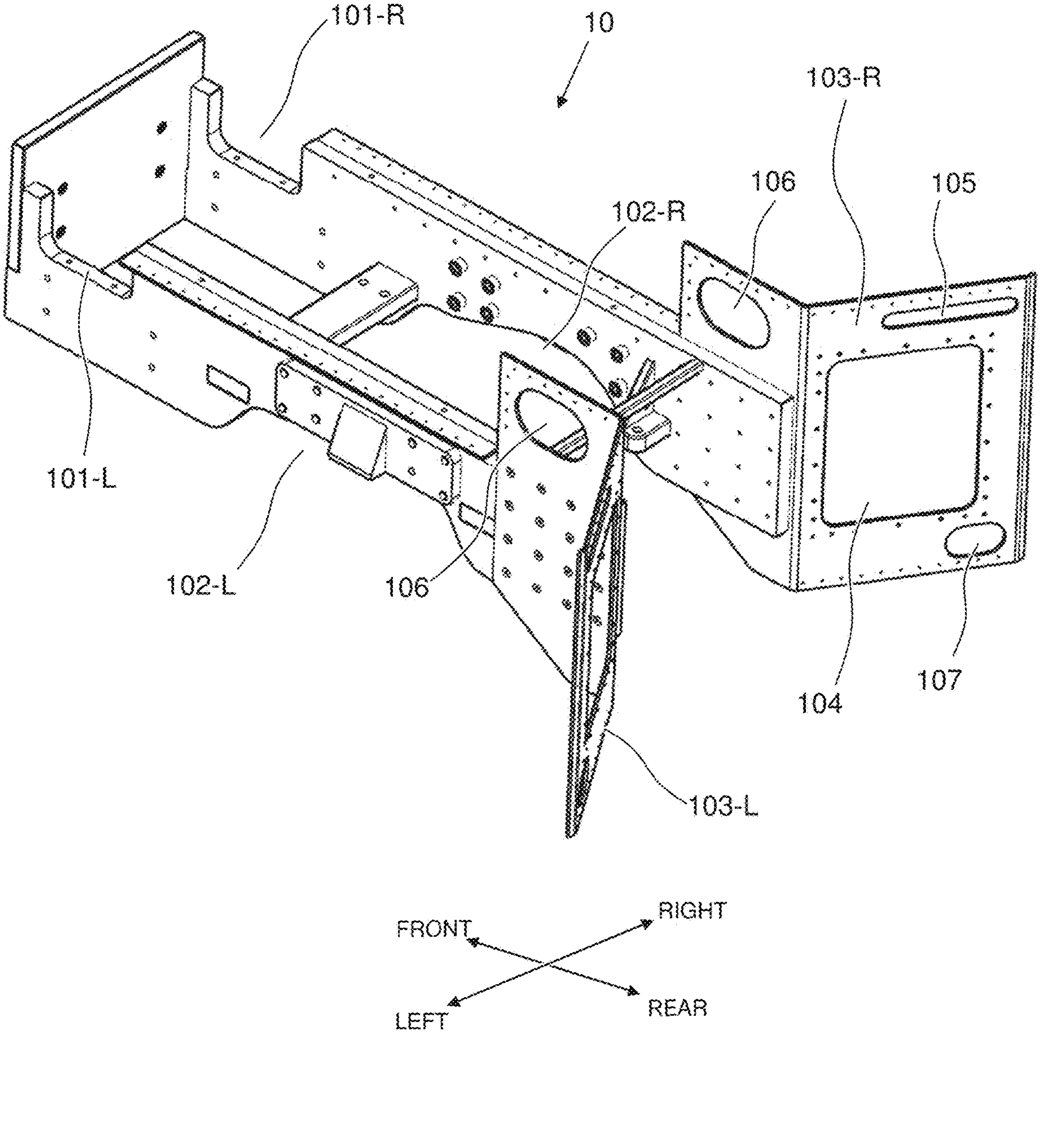
FIG. 12C shows a perspective left-rear view of a front frame of an electric vehicle according to a preferred embodiment of the present invention.
Figure 12D:
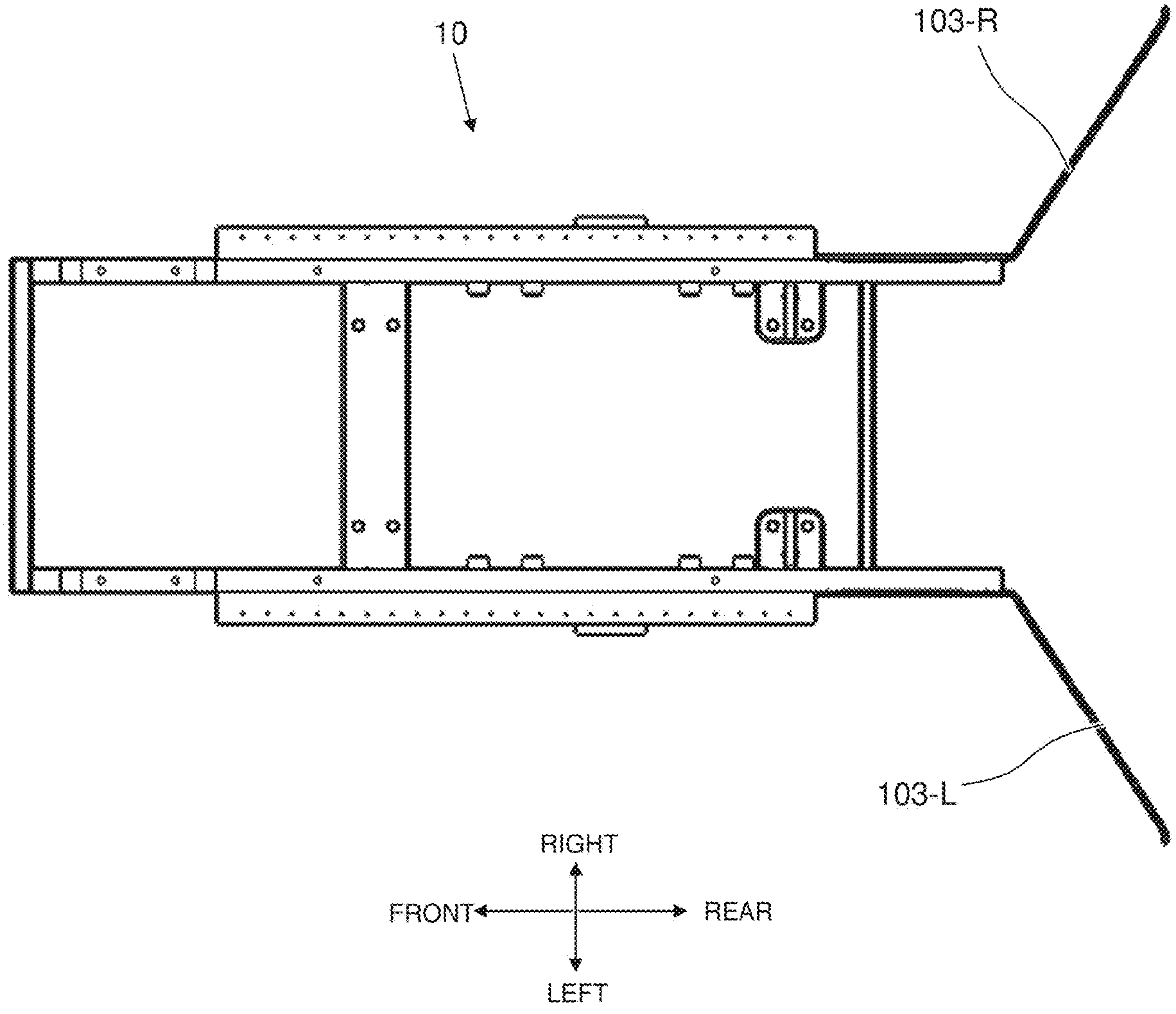
FIG. 12D shows a top view of a front frame of an electric vehicle according to a preferred embodiment of the present invention.
Figure 13:
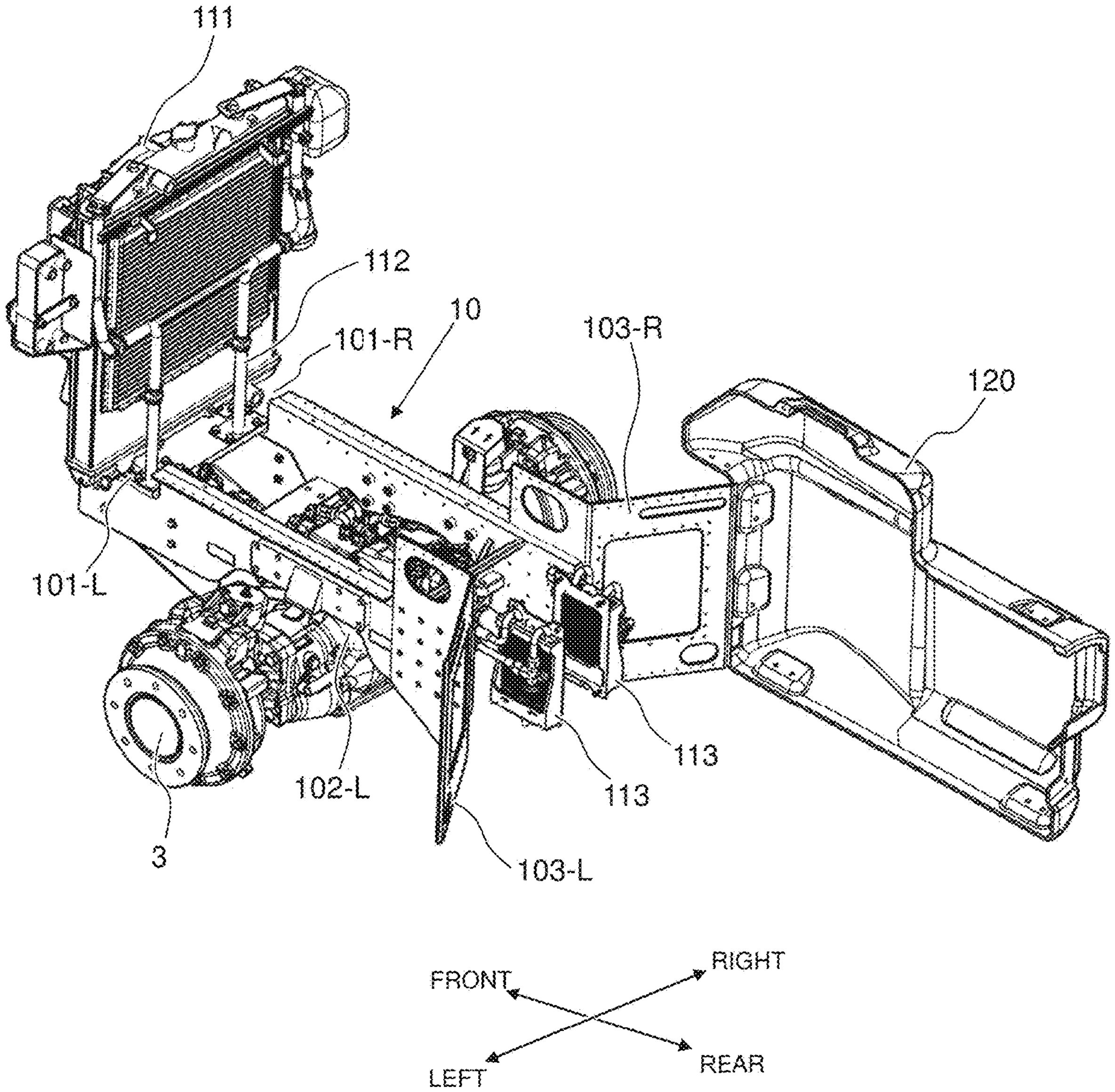
FIG. 13 shows a perspective left-rear view of a front frame of an electric vehicle and components provided with the front frame according to a preferred embodiment of the present invention.
Figure 14A:
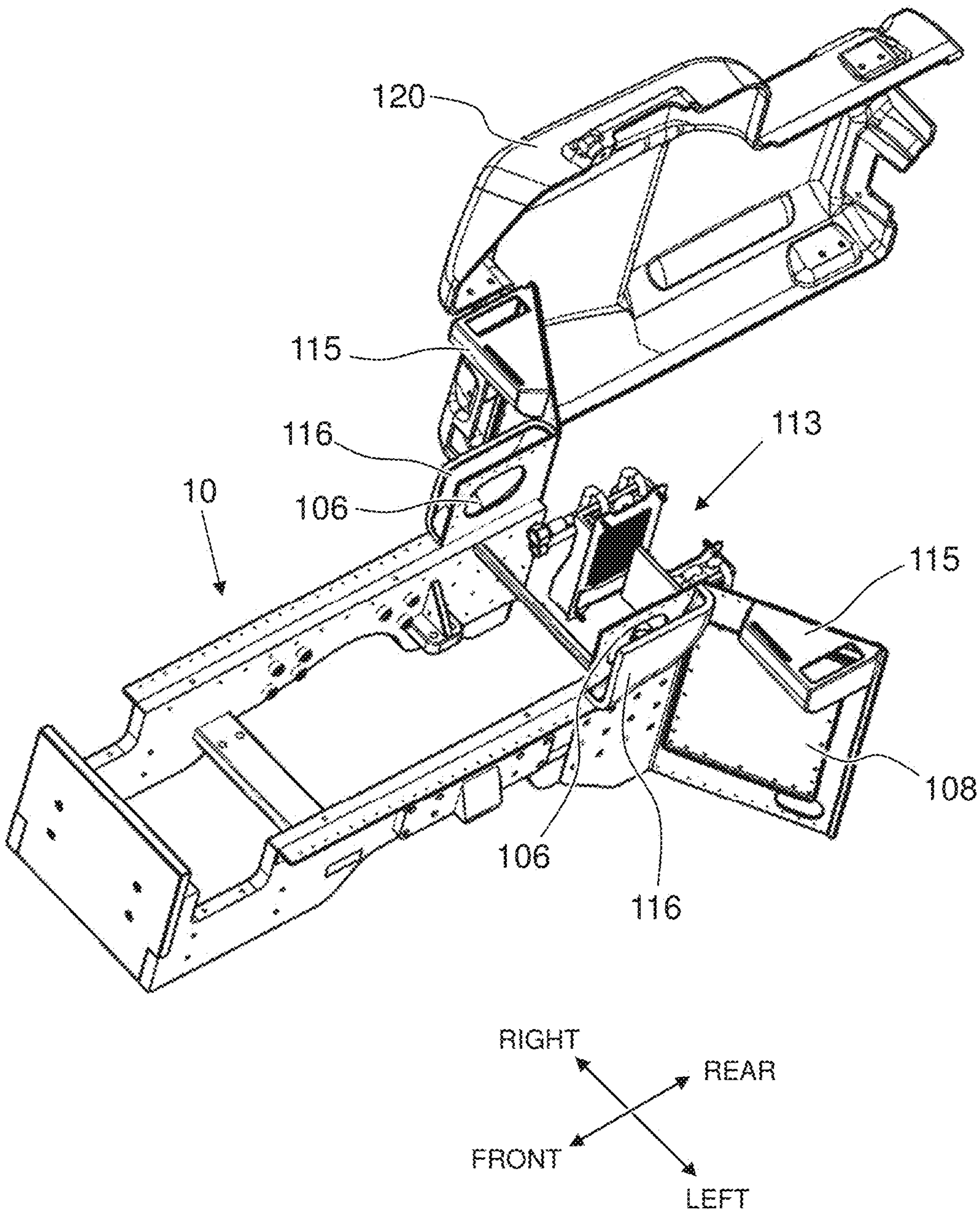
FIG. 14A shows a perspective left-front view of a front frame and air ducts of an electric vehicle according to a preferred embodiment of the present invention.
Figure 14B:
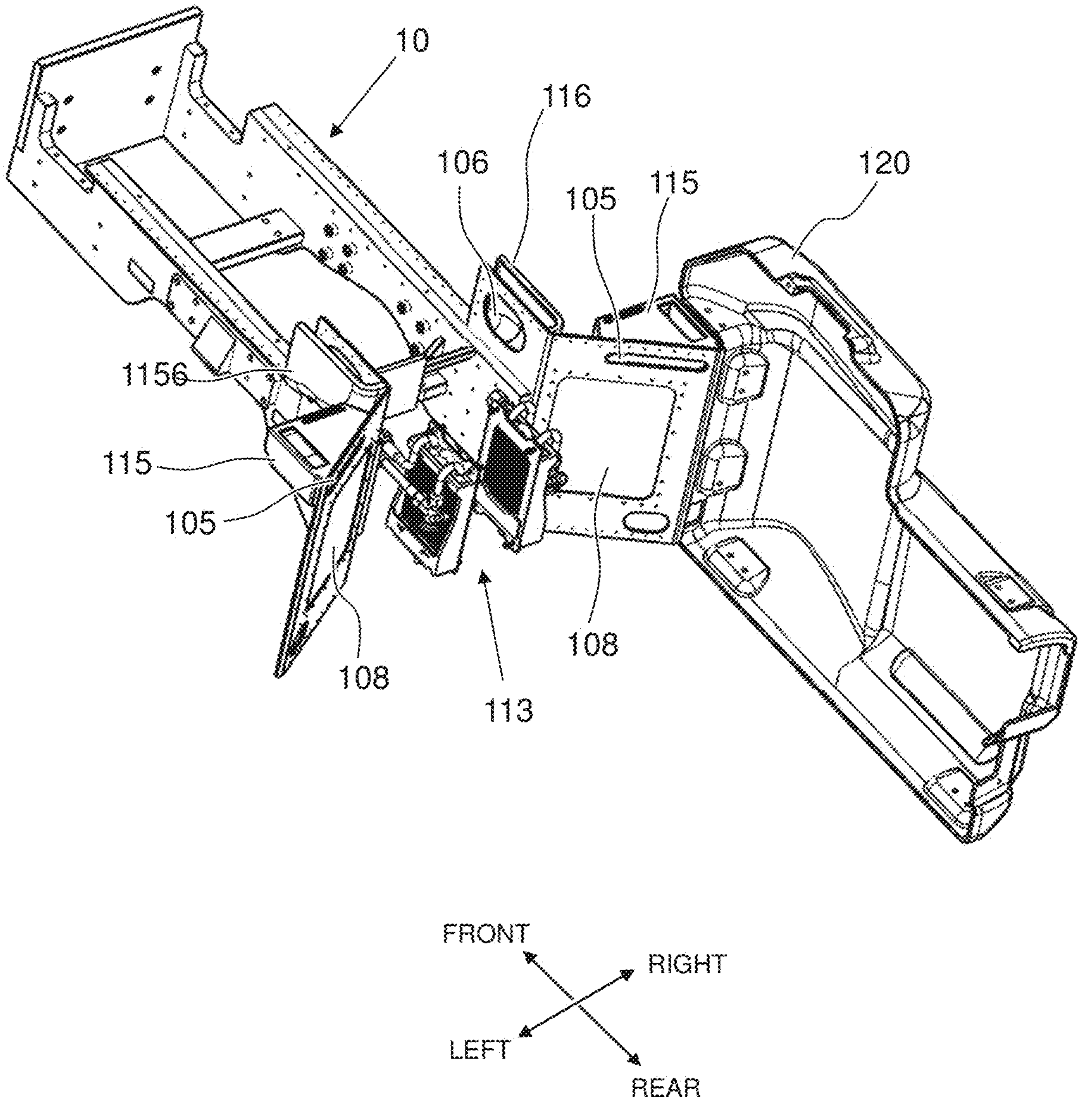
FIG. 14B shows a perspective left-rear view of a front frame and air ducts of an electric vehicle according to a preferred embodiment of the present invention.

FIG. 12A shows a left side view of the front frame 10, FIG. 12B shows a perspective left-front view of the front frame 10, FIG. 12C shows a perspective left-rear view of the front frame 10, and FIG. 12D shows a top view of the front frame 10. FIG. 13 shows a perspective left-rear view of the front frame 10 and components provided with the front frame 10. FIGS. 14A and 14B show, respectively, a perspective left-front view and a perspective left-rear view of the front frame 10 and additional components provided with the front frame 10.

In a preferred embodiment of the present invention, as shown, for example, in FIGS. 12A to 12C, the front frame 10 includes at least a first recessed portion 101, a second recessed portion 102, and a slanted portion 103.

The first recessed portion 101 includes a first recessed portion 101-R provided on a right side of the front frame 10 and a first recessed portion 101-L provided on a left side of the front frame 10, as shown in FIGS. 12B, 12C, and 13, for example. The first recessed portion 101 can receive and support one or more components of the vehicle 10, for example, a cooling structure of the vehicle 10. According to a preferred embodiment of the present invention, the first recessed portion 101 can receive a radiator/condenser fan 111, as shown in FIG. 13, for example. The radiator/condenser fan 111 can be mounted to the front frame 10 by one or more posts 112 that attach to the front frame 10 at the first recessed portion 101.

The second recessed portion 102 includes a second recessed portion 102-R provided on the right side of the front frame 10 and a second recessed portion 102-L provided on the left side of the front frame 10, as shown in FIGS. 12B and 12C. The second recessed portion 102 can receive one or more components of the vehicle 10. According to a preferred embodiment of the present invention, the second recessed portion 102 can receive the front axle 3, as shown in FIG. 13, and the front frame 10 can be supported by the front axle 3 at the second recessed portion 102.

The slanted portion 103 includes a slanted portion 103-R provided on the right side of the front frame 10 and a slanted portion 103-L provided on the left side of the front frame 10, as shown in FIGS. 12B to 12D and 13. The slanted portion 103 is angled away from a main body of the front frame 10. Specifically, the slanted portion 103-R provided on the right side of the front frame 10 extends in a rear-right direction of the vehicle 1, and the slanted portion 103-L provided on the left side of the front frame 10 extends in a rear-left direction of the vehicle 1.

The slanted portion 103 includes a first opening 104, a second opening 105, and a third opening 106, as shown in FIGS. 12A to 12C. The slanted portion 103 can also include a fourth opening 107.

The first opening 104 is preferably larger than each of the second opening 105, the third opening 106, and the fourth opening 107. Accordingly, the first opening 104 can provide an access point to interior components of the vehicle 10. The first opening 104 can be covered by a removable plate 108, as shown in FIGS. 14A and 14B.

The second opening 105 can define a portion of a first air channel. As shown in FIGS. 14A and 14B, the second opening 105 can communicate with a first air duct 115. The first air duct 115 can also be connected to a first opening in the battery housing 8. According to a preferred embodiment of the present invention, the first air duct 115 is mounted to the slanted portion 103, and the first air duct 115 completely covers or circumscribes the first opening 105.

The third opening 106 can define a portion of a second air channel. As shown in FIGS. 14A and 14B, the third opening 106 can communicate with a second air duct 116. The second air duct 116 can also be connected to a second opening in the battery housing 8. According to a preferred embodiment of the present invention, the second air duct 116 completely covers or circumscribes the third opening 106.

The fourth opening 107 can permit the passage of cables, coolant lines, refrigerant lines, oil lines, and the like.

According to a preferred embodiment of the present invention, one or more high voltage cables can pass through the fourth opening 107.

In a preferred embodiment of the present invention, as shown, for example, in FIGS. 13, 14A, and 14B, one or more evaporators 113 can be at least partially housed within the front frame 10. The evaporators 113 can be located directly between the slanted portion 103-R provided on the right side of the front frame 10 and the slanted portion 103-L provided on the left side of the front frame 10.

In a preferred embodiment of the present invention, as shown, for example, in FIGS. 1A to 1D, 1F, 1G, 13, 14A, and 14B, the vehicle 1 can include one or more side housings 120. As shown in FIGS. 13, 14A, and 14B, the side housing 120 can be located adjacent to, or directly connected with, the slanted portion 103 of the front frame 10. Although FIGS. 13, 14A, and 14B only show a single side housing 120 provided with the slanted portion 103-R on the right side of the front frame 10, a further side housing 120 can similarly be provided with the slanted portion 130-L on the left side of the front frame 10. According to a preferred embodiment of the present invention as shown, for example, in FIGS. 14A and 14B, the first air duct 115 can be located adjacent to, or directly connected with, the side housing 120.

In a preferred embodiment of the present invention, as shown, for example, in FIGS. 4, 5A, 5B, 6A and 6B, the battery housing 8 at least partially surrounds the front frame 10. More specifically, the third battery housing portion 30, the fourth battery housing 32, and the fifth battery housing portion 34 can each be located above the front frame 10, and the fifth battery housing portion 34 can be mounted to an upper portion of the front frame 10. Each of the first battery housing portion 26 and the second battery housing portion 28 can be located at a rear portion of the front frame 10, in particular, rearward of the slanted portion 103 of the front frame 10. Each of the first battery housing portion 26 and the second battery housing portion 28 can be connected with the slanted portion 103 of the front frame 10. An outer edge of each of the first battery housing portion 26 and the second battery housing portion 28 can be aligned with an outer edge of the slanted portion 103 of the front frame 10.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric work vehicle comprising:
- a chassis;
- a battery housing; and
- a front axle; wherein
- the chassis includes a front frame that is attached to the front axle and supports the battery housing;
- a portion of the front frame overlaps a portion of the battery housing in a front view of the electric work vehicle;
- the front frame includes a slanted portion connected to the battery housing;
- the slanted portion includes a first opening covered by a removable plate;
- the slanted portion includes a second opening connected to a first air duct.

2. The electric work vehicle according to claim 1, wherein the front frame is connected to the battery housing.

3. The electric work vehicle according to claim 2, wherein a portion of the battery housing is located above the front frame in an up-down direction of the electric work vehicle.

4. The electric work vehicle according to claim 2, wherein a portion of the battery housing is located behind the front frame in a front-rear direction of the electric work vehicle.

5. The electric work vehicle according to claim 1, further comprising:
- a cooling structure, wherein
- the front frame includes a recessed portion; and
- at least a portion of the cooling structure is located within the recessed portion of the front frame.

6. The electric work vehicle according to claim 5, wherein the cooling structure includes a fan.

7. The electric work vehicle according to claim 5, wherein the cooling structure includes at least one post that is mounted to the recessed portion of the front frame.

8. The electric work vehicle according to claim 1, wherein the first air duct is further connected to a battery housing opening.

9. The electric work vehicle according to claim 1, wherein the front frame includes a third opening connected to a second air duct.

10. The electric work vehicle according to claim 9, wherein the second air duct is further connected to a battery housing opening.

11. The electric work vehicle according to claim 9, wherein the slanted portion includes a fourth opening.

12. The electric work vehicle according to claim 11, wherein at least one electrical cable passes through the fourth opening.

13. The electric work vehicle according to claim 1, further comprising a side housing connected to the front frame.

14. The electric work vehicle according to claim 13, wherein the side housing is connected to the slanted portion of the front frame.

15. The electric work vehicle comprising an evaporator housed within the front frame.

16. The electric work vehicle according to claim 1, wherein
- the chassis includes an intermediate frame attached to a rear portion of the battery housing, and
- the intermediate frame is made of metal.

17. An electric work vehicle comprising:
- a chassis;
- a battery housing;
- a front axle; and
- an evaporator, wherein
- the chassis includes a front frame that is attached to the front axle and supports the battery housing;
- a portion of the front frame overlaps a portion of the battery housing in a front view of the electric work vehicle;
- the front frame includes a first slanted portion connected to the battery housing,
- the front frame includes a second slanted portion connected to the battery housing, and
- the evaporator is located between the first slanted portion and the second slanted portion.

* * * * *